US012455162B2

(12) United States Patent
Ito et al.

(10) Patent No.: US 12,455,162 B2
(45) Date of Patent: Oct. 28, 2025

(54) THREE-DIMENSIONAL SHAPE MEASURING METHOD AND THREE-DIMENSIONAL SHAPE MEASURING APPARATUS

(71) Applicants: Tohoku University, Miyagi (JP); Konica Minolta, Inc., Tokyo (JP)

(72) Inventors: Hidechika Ito, Sendai (JP); Shingo Kagami, Sendai (JP); Koichi Hashimoto, Sendai (JP); Daichi Suzuki, Tachikawa (JP); Yoshiyuki Toso, Toyokawa (JP); Yoshihiro Inagaki, Hachioji (JP)

(73) Assignees: Konica Minolta, Inc., Tokyo (JP); Tohoku University, Miyagi (JP)

( * ) Notice: Subject to any disclaimer, the term of this patent is extended or adjusted under 35 U.S.C. 154(b) by 406 days.

(21) Appl. No.: 18/075,026

(22) Filed: Dec. 5, 2022

(65) Prior Publication Data
US 2023/0175840 A1    Jun. 8, 2023

(30) Foreign Application Priority Data
Dec. 6, 2021   (JP) .................... 2021-197429

(51) Int. Cl.
*G01B 11/25*   (2006.01)
*G06T 7/521*   (2017.01)
*G06T 7/55*    (2017.01)

(52) U.S. Cl.
CPC .............. *G01B 11/25* (2013.01); *G06T 7/521* (2017.01); *G06T 7/55* (2017.01)

(58) Field of Classification Search
CPC ..... G01B 11/25; G01B 11/2513; G06T 7/521; G06T 7/55; G06T 2207/10152
(Continued)

(56) References Cited

U.S. PATENT DOCUMENTS 5,680,474 A  * 10/1997  Iijima ................. G06V 10/147
                                                382/154
6,674,893 B1 *  1/2004  Abe ....................... G06T 7/521
                                                356/610

(Continued)

OTHER PUBLICATIONS

Chiba, Naoya and Koichi Hashimoto, "Ultra-Fast Multi-Scale Shape Estimation of Light Transport Matrix for Complex Light Reflection Objects," IEEE International Conference on Robotics and Automation (ICRA2018), p. 6147-6152, May 21-25, 2018 (6 pages).

*Primary Examiner* — Kathleen Y Dulaney
(74) *Attorney, Agent, or Firm* — Osha Bergman Watanabe & Burton LLP

(57) ABSTRACT

A three-dimensional shape measuring method includes: a first step to: project first and second projection images on a target object, wherein the first projection images include row-direction stripe patterns different from each other, and the second projection images include column-direction stripe patterns different from each other, and obtain first and second captured images of the target object, wherein the first captured images are captured while the first projection images are projected, and the second captured images are captured while the second projection images are projected; a second step to identify a corresponding projection pixel of the first and second projection images, wherein the corresponding projection pixel corresponds to each of captured pixels of the first and second captured images; and a third step to identify a 3D shape of the target object based on a result of the second step.

10 Claims, 11 Drawing Sheets

(58) Field of Classification Search
USPC .................. 382/100, 154, 106; 356/603, 610
See application file for complete search history.

(56) References Cited

U.S. PATENT DOCUMENTS

| | | | | |
|---|---|---|---|---|
| 7,440,590 | B1* | 10/2008 | Hassebrook | G06V 10/145 |
| | | | | 359/263 |
| 7,724,379 | B2* | 5/2010 | Kawasaki | G06T 7/80 |
| | | | | 356/603 |
| 8,326,020 | B2* | 12/2012 | Lee | G01B 11/25 |
| | | | | 356/604 |
| 10,877,622 | B2* | 12/2020 | Romano | G06F 3/04815 |
| 2003/0086590 | A1* | 5/2003 | Trajkovic | G06T 7/269 |
| | | | | 382/107 |
| 2008/0205748 | A1* | 8/2008 | Lee | G01B 11/25 |
| | | | | 382/154 |
| 2017/0176575 | A1* | 6/2017 | Smits | G01S 7/4808 |
| 2019/0236796 | A1* | 8/2019 | Blasco Claret | G06T 7/557 |
| 2020/0334844 | A1* | 10/2020 | Miyata | G06T 7/0004 |
| 2022/0321819 | A1* | 10/2022 | Wang | H04N 13/00 |
| 2022/0398760 | A1* | 12/2022 | Matsumoto | G06V 10/761 |

* cited by examiner

FIG.15
| | LTM CALCULATION TIME BY CPU (SECOND) | |
|---|---|---|
| | THIS EMBODIMENT | COMPARATIVE EXAMPLE |
| SAMPLE 1 | 4.6 | 7.8 |
| SAMPLE 2 | 4.6 | 7.4 |
| SAMPLE 3 | 4.1 | 6.5 |
| SAMPLE 4 | 3.9 | 6.7 |
| AVERAGE | 4.3 | 7.1 |
FIG.16A
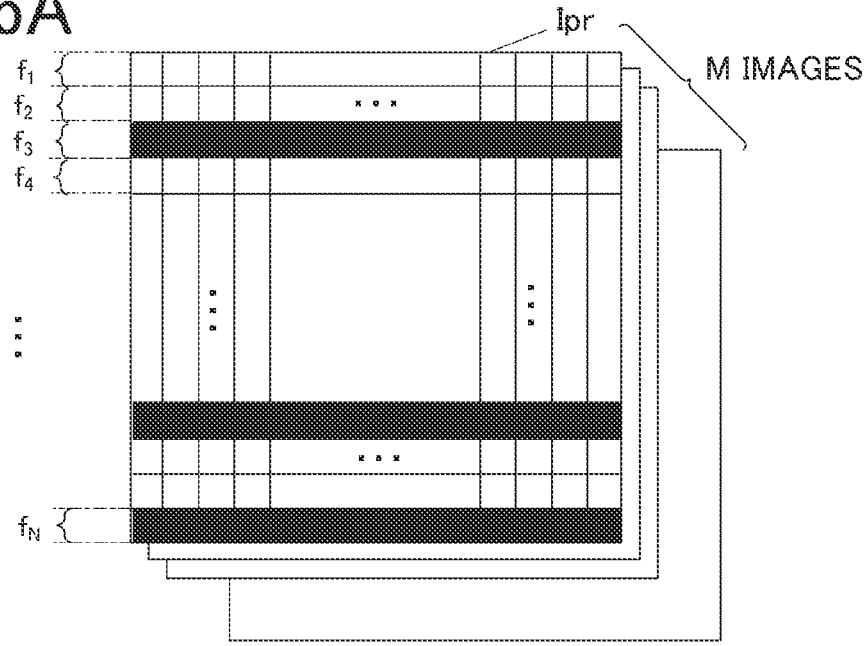
FIG.16B
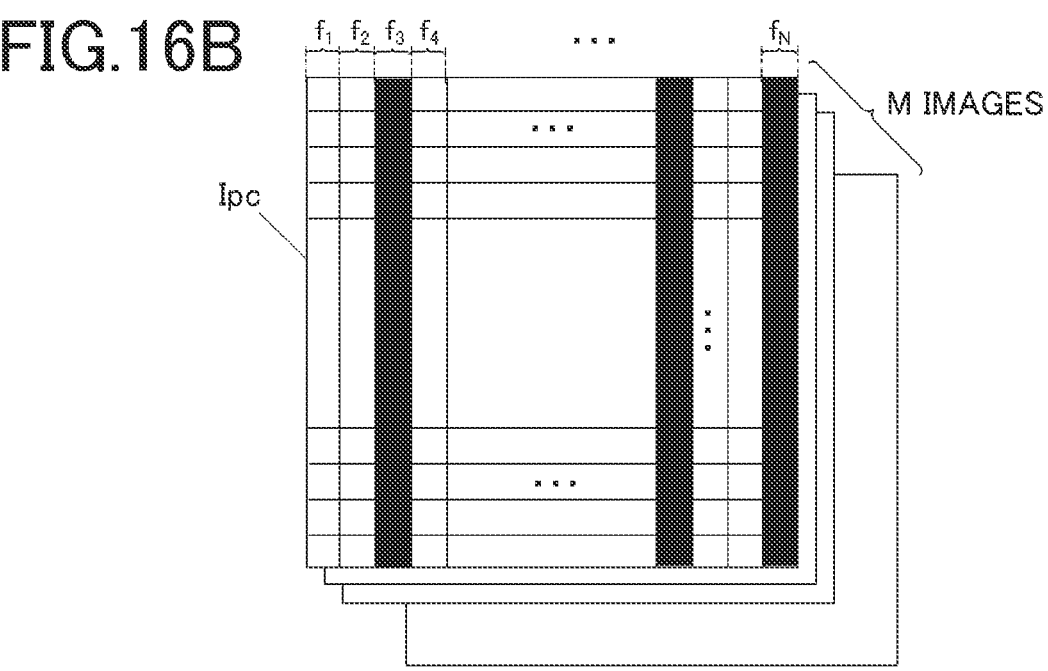

THREE-DIMENSIONAL SHAPE MEASURING METHOD AND THREE-DIMENSIONAL SHAPE MEASURING APPARATUS

CROSS-REFERENCE TO RELATED APPLICATIONS

The entire disclosure of Japanese Patent Application No. 2021-197429 filed on Dec. 6, 2021 is incorporated herein by reference.

BACKGROUND

Technical Field

The present disclosure relates to a three-dimensional shape measuring method and a three-dimensional shape measuring apparatus.

Description of Related Art

An active stereo method is known for measuring the three-dimensional (3D) shape of a target object. The active stereo method projects a pattern image (projection image) on the target object with a projection unit (e.g., projector); captures an image of the target object on which the projection image is projected with an imaging unit; identifies combinations between projection pixels of the projection image and captured pixels of the captured image based on the captured image; and obtains respective 3D points by using the principle of the triangulation.

When there are non-negligible components other than direct reflection components bounced on the surface of the target object (e.g., internal reflection in a transparent/translucent material, multiple reflection on a glossy/shiny surface), the active stereo method may extract inappropriate 3D points. This results in measurement errors. An approach to address this issue is to obtain multiple combinations between captured pixels and projection pixels and then extract a combination corresponding to direct reflection from among the multiple combinations. As such an approach for measuring the 3D shape, a Light Transport Matrix (LTM) method is disclosed in a non-patent document (Naoya Chiba and Koichi Hashimoto, "Ultra-fast multi-scale shape estimation of light transport matrix for complex light reflection objects, IEEE" International Conference on Robotics and Automation (ICRA2018), pp. 6147-6152, 2018).

The LTM method projects projection images in which each pixel has a random pixel value (hereinafter, patterns of the projection images are called "random patterns"); captures camera images at the time of projection; obtains an LTM that describes all the combinations between camera pixels and projection pixels by applying sparse estimation, based on the camera images; and extracts a corresponding point(s) that satisfies the epipolar constraint from among the obtained corresponding points. Sparse estimation is a method to estimate non-zero elements of an LTM based on a small number of observations (i.e., to solve an underdetermined system of simultaneous equations) by utilizing the sparsity of the LTM (the characteristic that many of the elements are zero). To calculate an LTM by applying sparse estimation, a known algorithm can be applied that numerically solves LASSO (Least Absolute Shrinkage and Selection Operators) minimization problem. Thus, the LTM method can identify combinations between numerous projection pixels and camera pixels by performing mathematical operation.

However, calculation of LTM by applying sparse estimation using random patterns requires great computational complexity and long computing time. To address this issue, the non-patent document further proposes a multiscale LT Matrix estimation method that efficiently identifies non-zero elements of LTM by changing the resolution of the projection image step-by-step and reducing omissible calculations.

However, in changing the resolution step-by-step, the multiscale LT Matrix estimation method needs to use the calculation result regarding the previous resolution to perform the calculation regarding the later resolution. Although the multiscale LT Matrix estimation method can suppress the computational complexity in the later stages, the method does not allow parallel calculation of the respective stages. Therefore, the method still requires a long computing time.

SUMMARY

One or more embodiments of the present invention provide a three-dimensional shape measuring method and a three-dimensional shape measuring apparatus that can shorten the computing time.

According to an aspect of the present invention, there is provided a three-dimensional (3D) shape measuring method including: a first step to (i) project, with a projector configured to project projection images, first projection images including row-direction stripe patterns different from each other and second projection images including column-direction stripe patterns different from each other on a target object and (ii) obtain, with an image capturing device configured to obtain captured images of the target object, first captured images when the respective first projection images are projected and second captured images when the respective second projection images are projected; a second step to identify a corresponding projection pixel of the projection images, the corresponding projection pixel corresponding to each of captured pixels of the captured images; and a third step to identify a 3D shape of the target object based on a result of the second step, wherein the second step includes: identifying a corresponding pixel row that corresponds to each of the captured pixels from among projection pixel rows constituting the projection images, based on the first captured images and the row-direction stripe patterns of the first projection images; identifying a corresponding pixel column that corresponds to each of the captured pixels from among projection pixel columns constituting the projection images, based on the second captured images and the column-direction stripe patterns of the second projection images; identifying a candidate projection pixel that is at an intersection of the corresponding pixel row and the corresponding pixel column and that satisfies an epipolar constraint; and identifying the corresponding projection pixel that corresponds to each of the captured pixels from among the candidate projection pixel.

According to another aspect of the present invention, there is provided a 3D shape measuring apparatus including a hardware processor, wherein the hardware processor performs: a first process of (i) projecting, with a projector configured to project projection images, first projection images including row-direction stripe patterns different from each other and second projection images including column-direction stripe patterns different from each other on a target object and (ii) obtaining, with an image capturing device configured to obtain captured images of the target object, first captured images when the respective first projection images are projected and second captured images when the respective second projection images are projected; a second process of identifying a corresponding projection pixel of the projection images, the corresponding projection pixel corresponding to each of captured pixels of the captured images; and a third process of identifying a 3D shape of the target object based on a result of the second process, wherein the second process includes: identifying a corresponding pixel row that corresponds to each of the captured pixels from among projection pixel rows constituting the projection images, based on the first captured images and the row-direction stripe patterns of the first projection images; identifying a corresponding pixel column that corresponds to each of the captured pixels from among projection pixel columns constituting the projection images, based on the second captured images and the column-direction stripe patterns of the second projection images; identifying a candidate projection pixel that is at an intersection of the corresponding pixel row and the corresponding pixel column and that satisfies an epipolar constraint; and identifying the corresponding projection pixel that corresponds to each of the captured pixels from among the candidate projection pixel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 15 shows measurement results of LTM calculation times in one or more embodiments and a comparative example by a CPU;

FIG. 16A shows first projection images; and

FIG. 16B shows second projection images.

DETAILED DESCRIPTION

Hereinafter, embodiments of a 3D shape measuring method and a 3D shape measuring apparatus are described with reference to the figures.

<Configuration of 3D Shape Measurement System 1>

Figure 1:
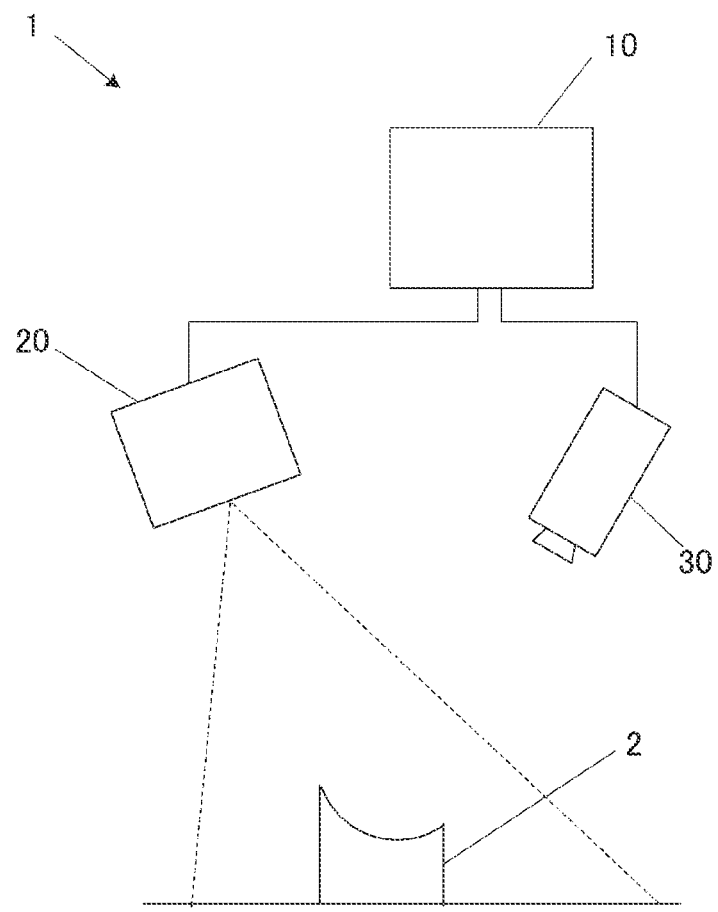
FIG. 1 shows a schematic configuration of a 3D shape measuring system.

FIG. 1 shows a schematic configuration of a 3D shape measuring system 1 according to one or more embodiments of the present invention. However, the scope of the invention is not limited to the disclosed embodiments.

The 3D shape measuring system 1 includes a 3D shape measuring apparatus 10, a projector 20, and an image capturing device 30. In measuring operation, the projector 20 and the image capturing device 30 are oriented and fixed at positions such that they satisfy a predetermined geometric relation. The projector 20 and the image capturing device 30 are connected to the 3D shape measuring apparatus 10 to allow data communications. The 3D shape measuring apparatus 10 and the projector 20/the image capturing device 30 may perform data communications wirelessly or through wires.

The projector 20 projects projection images Ip having certain patterns (see FIG. 2) on the target object 2 by modulating light output from a light source using a projector element(s). The projector element of the projector 20 may be a digital micromirror device (DMD), for example. When the projector element is a DMD, each of the pixels of the projector element arranged in a matrix has a micromirror. The projector 20 switches angles of the individual micromirrors of pixels of the projector element very quickly based on the values of image data, thereby determining whether to reflect light from the respective pixels onto the projection surface. The projector 20 thus forms (projects) a projection image by determining the distribution of the reflected light.

The projector element is not limited to a DMD but may be a liquid crystal device that can determine whether to pass light through respective pixels (or whether to reflect light on the respective pixels), for example.

Figure 2:
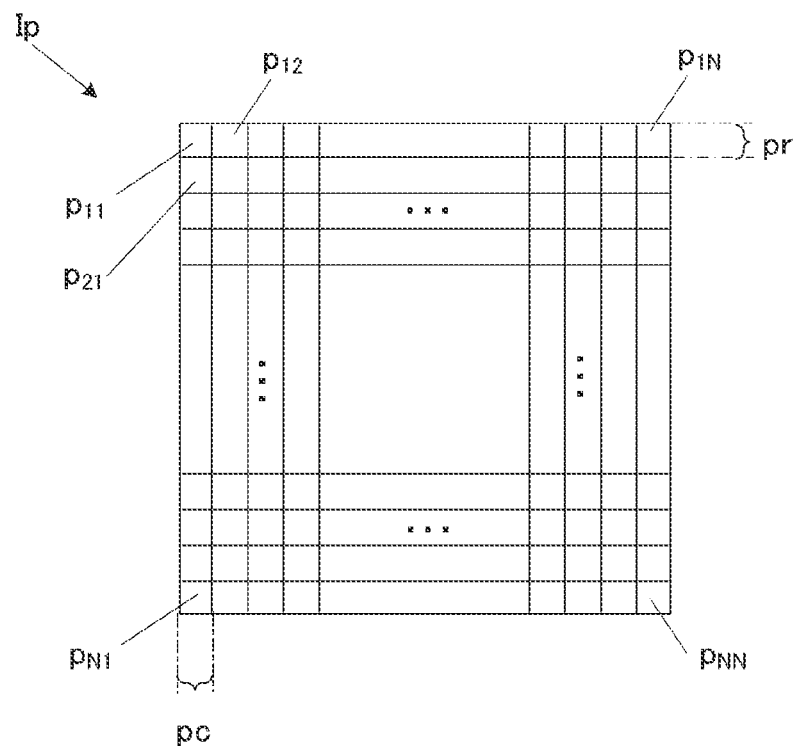
FIG. 2 shows a projection image to be projected by a projector.

FIG. 2 shows a projection image Ip to be projected by the projector 20.

The projection image Ip has multiple projection pixels p that are arranged to form N projection pixel rows pr (multiple pixel rows) and N projection pixel columns pc (multiple pixel columns). The projection pixels p thus form an N×N square matrix. In one or more embodiments, N is 256. In FIG. 2, a projection pixel p at the r-th row and the c-th column is denoted as "projection pixel $p_{rc}$" ($1 \le r \le N$, $1 \le c \le N$). The projection pixels p of the projection image Ip in FIG. 2 correspond to pixels of the projector element of the projector 20 one-to-one.

The number N of the projection pixel rows pr and the number N of the projection pixel columns pc is not limited to 256. The number N may be appropriately changed according to the resolution of 3D shape measurement or the processing capacity of the 3D shape measuring apparatus 10, for example. The number of the projection pixel rows pr may be different from the number of the projection pixel columns pc.

The image capturing device 30 shown in FIG. 1 is a camera that obtains captured images Ic (see FIG. 3) of the target object 2 by imaging the target object 2 with an image sensor(s). Pixels of the image sensor are arranged in a matrix and each have a photodetector element that outputs a detection current corresponding to the intensity of incident light.

On the basis of the detection currents from the respective photodetector elements of the image sensor, the image capturing device 30 generates a monochrome captured image Ic and outputs it to the 3D shape measuring apparatus 10.

Figure 3:
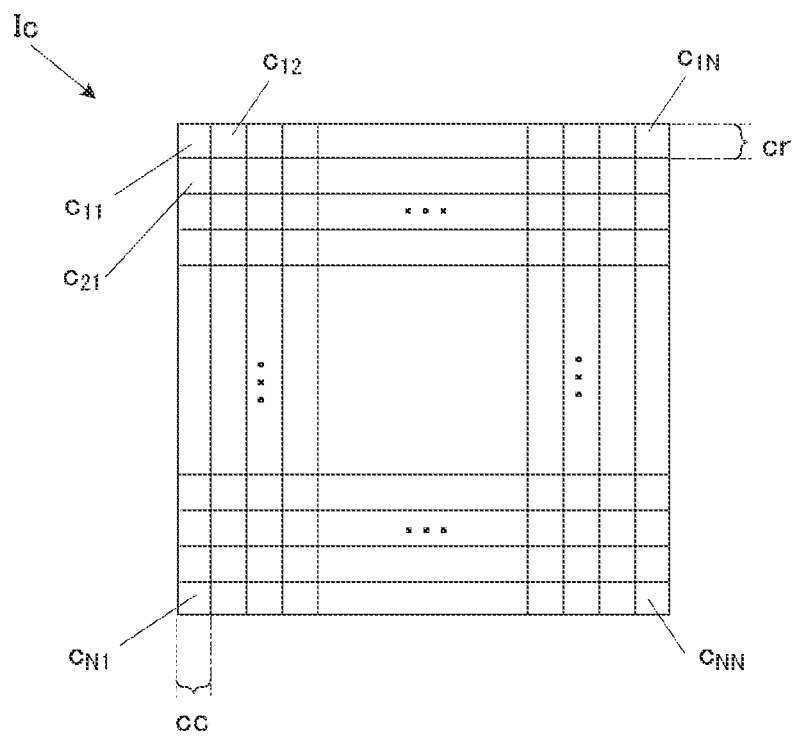
FIG. 3 shows a captured image to be captured by an image capturing device.

FIG. 3 shows a captured image Ic to be captured by the image capturing device 30.

The captured image Ic has multiple captured pixels c that are arranged to form N captured pixel rows cr and N captured pixel columns cc. The captured pixels c thus form an N×N square matrix. As described above, N is 256 in one or more embodiments. In FIG. 3, a captured pixel c at the r-th row and the c-th column is denoted as "captured pixel $c_{rc}$" ($1 \leq r \leq N$, $1 \leq c \leq N$). The captured pixels c of the captured image Ic shown in FIG. 3 correspond to the pixels of the image sensor of the image capturing device 30 one-by-one. The image capturing device 30 generates the captured image Ic having the N×N pixel resolution.

The number N of the captured pixel rows cr and the number N of the captured pixel columns cc is not limited to 256. The number N may be appropriately changed according to the resolution of 3D shape measurement or the processing capacity of the 3D shape measuring apparatus 10, for example. The number of the captured pixel rows cr may be different from the number of the captured pixel columns cc. The number of the captured pixel rows cr may not necessarily be equal to the number of the projection pixel rows pr. Also, the number of the captured pixel columns cc may not necessarily be equal to the number of the projection pixel columns pc.

The 3D shape measuring apparatus 10 shown in FIG. 1 controls the projecting operation of the projector 20 and the image capturing operation of the image capturing device 30. The 3D shape measuring apparatus 10 measures (identifies) the 3D shape of the target object 2 based on (i) patterns of the projection images Ip projected by the projector 20 and (ii) the captured images Ic obtained by the image capturing device 30, and generates 3D shape data of the measured the 3D shape.

Figure 4:
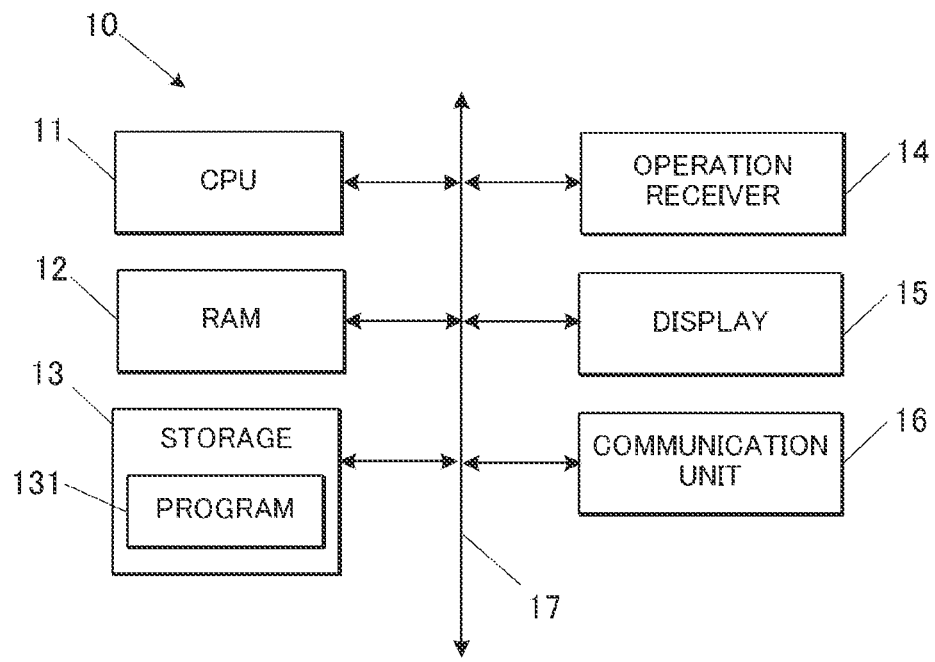
FIG. 4 shows a block diagram of main functional components of a 3D shape measuring apparatus.

FIG. 4 shows a block diagram of main functional components of the 3D shape measuring apparatus 10.

The 3D shape measuring apparatus 10 includes a central processing unit (CPU) 11 (hardware processor), a random access memory (RAM) 12, a storage 13, an operation receiver 14, a display 15, a communication unit 16, and a bus 17. The components of the 3D shape measuring apparatus 10 are connected via the bus 17.

The CPU 11 is a processor that controls the operation of the components of the 3D shape measuring apparatus 10. The CPU 11 reads a program(s) 131 stored in the storage 13, loads the program into the work area of the RAM 12, and executes various processes in accordance with the loaded program. For example, the CPU 11 causes the projector 20 to project the projection image Ip on the target object 2 at a predetermined timing, the projection image Ip having a predetermined pattern. The CPU 11 also causes the image capturing device 30 to capture an image of the target object 2 on which the projection image Ip is projected at the same timing as the projector 20 projects the projection image Ip, to obtain the captured image Ic. The CPU 11 also performs various arithmetic processes (described later) to identify the 3D shape of the target object 2 and generate 3D shape data, and stores the 3D shape data in the storage 13.

The RAM 12 provides the CPU 11 with a working memory space and stores temporary data. The RAM 12 may include a nonvolatile memory.

The storage 13 is a non-transitory storage medium that is readable by the CPU 11 as a computer. The storage 13 consists of a hard disk drive (HDD), a solid state drive (SSD), and/or the like. The storage 13 stores the program 131 to be executed by the CPU 11, various kinds of data to be referred to in executing the program 131, the 3D shape data generated by the CPU 11, and so forth. The program 131 is stored in the storage 13 in the form of a computer-readable program code.

The operation receiver 14 includes a pointing device (e.g., mouse) and a keyboard. The operation receiver 14 receives positional inputs, key inputs, and so forth by a user and outputs the user's operation information to the CPU 11.

The display 15 includes a liquid crystal display or the like, and displays various contents such as 3D shape measurement results and various statuses in accordance with control signals from the CPU 11.

The communication unit 16 communicates with the projector 20 and the image capturing device 30 to transmit and receive data. The communication unit 16 may also be configured to perform data communications with devices/systems other than the projector 20 or the image capturing device 30 over a network, for example.

<Principle of 3D Shape Measurement by 3D Shape Measuring System 1>

Next, the principle of 3D shape measurement by the 3D shape measuring system 1 is described.

The 3D shape measuring system 1 in one or more embodiments measures the 3D shape of the target object 2 by the active stereo method. Specifically, the 3D shape measuring system 1 causes the projector 20 to project the projection image Ip having a predetermined pattern and causes the image capturing device 30 to capture an image of the target object 2 on which the projection image Ip is projected to obtain the captured image Ic. On the basis of the projected pattern and the captured image Ic, the 3D shape measuring system 1 identifies correspondences between the captured pixels c of the captured image Ic and the projection pixels p of the projection image Ip. The 3D shape measuring system 1 then obtains 3D points on the target object 2 based on (i) the identified correspondences and (ii) the geometric relation between the projector 20 and the image capturing device 30 by applying the principle of the triangulation.

Figure 5:
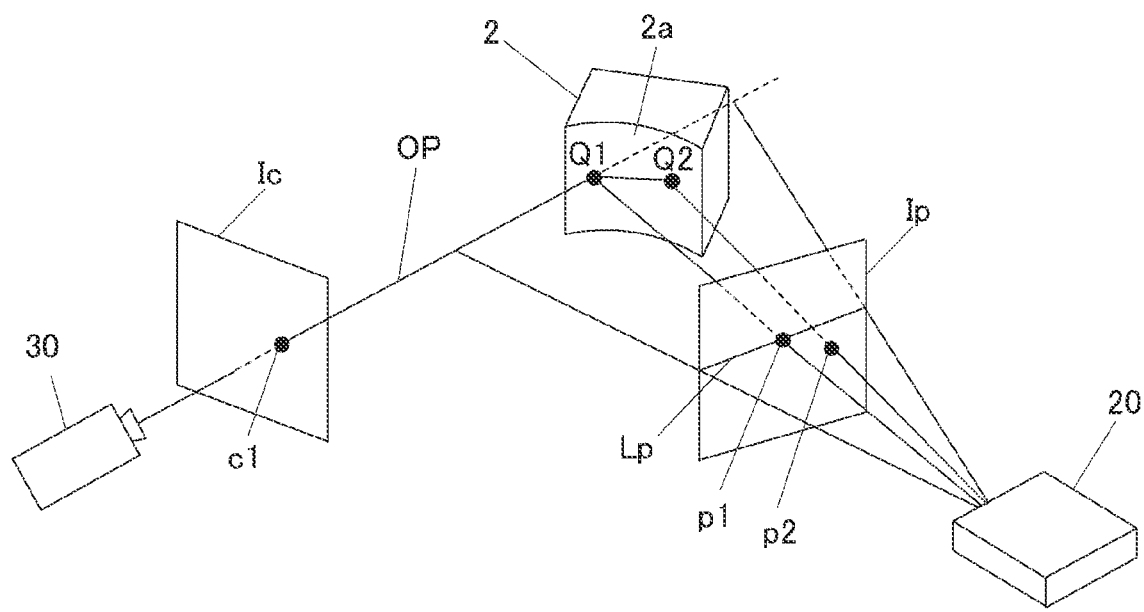
FIG. 5 is a figure to explain the principle of 3D measurement.

FIG. 5 is a figure to explain the principle of 3D measurement.

FIG. 5 shows the projection image Ip projected on the target object 2 by the projector 20 and the captured image Ic obtained by the image capturing device 30. Part of light components constituting the projection image Ip are reflected on the surface of the target object 2 and captured as the captured image Ic.

Once the correspondence between (i) a light component detected as a captured pixel c of the captured image Ic and (ii) a light component coming from a projection pixel p of the projection image Ip is identified, the 3D point of the target object 2 at which the light is reflected can be identified by applying the triangulation method, based on (i) the identified correspondence and (ii) the known geometric relation between the projector 20 and the image capturing device 30. For example, when the light component detected by a captured pixel c1 in FIG. 5 is identified as coming from the projection pixel p1, the point Q1 on the target object 2 can be identified as the light reflection point by applying the principle of triangulation. Therefore, the distribution of light reflection points on the surface of the target object 2, namely the 3D shape of the target object 2, can be identified by identifying correspondences between all the captured pixels c of the captured image Ic and the projection pixels p (also called corresponding projection pixels pn).

However, the above method is based on the assumption that light components are bounced only once on the surface of the target object 2 (hereinafter called direct reflection light) and detected as the captured pixels c. When there are non-negligible components other than direct reflection light (e.g., internal reflection in a transparent/translucent material, multiple reflection on a glossy surface), inappropriate 3D points may be extracted and cause measurement errors.

For example, assume that part of the surface of the target object 2 is a glossy curved surface 2a, as shown in FIG. 5. In the case, the captured pixel c1 receives a light component coming from the projection pixel p2 and bounced twice on the curved surface 2a, as well as a light component coming from the projection pixel p1. If the combination of the captured pixel c1 and the projection pixel p2 is used to identify the reflection point based on the principle of the triangulation, an incorrect point that does not exist on the curved surface 2a is identified. Thus, errors occur in measuring the 3D shape.

Further, if light is reflected inside the transparent-translucent target object 2 (internal reflection), the reflection point inside the target object 2 is wrongly identified, resulting in errors in measuring the 3D shape.

To deal with the above issue, the 3D shape measuring system of one or more embodiments obtains multiple combinations between a captured pixel c and projection pixels p beforehand, and extracts the combination that corresponds to direct reflection to suppress the measurement errors. Specifically, among multiple candidate projection pixels p for a captured pixel c, the 3D shape measuring system 1 finds a projection pixel p that satisfies the epipolar constraint and identifies this projection pixel p as the corresponding projection pixel pn that corresponds to the captured pixel c. Herein, the projection pixel p that is on the epipolar line Lp on the projection image Ip is identified as the projection pixel p that satisfies the epipolar constraint. The epipolar line Lp shown in FIG. 5 is determined by (i) the geometric relation between the projector 20 and the image capturing device 30 and (ii) the light path OP of a light ray that is detected as the captured pixel c1. Specifically, an epipolar plane is the plane that passes through the light path OP, the optical center of the projector 20 (the convergent point at which projection light rays that pass through the projection image Ip converge), and the optical center of the image capturing device 30 (the convergent point at which captured light rays that pass through the captured image Ic converge). The epipolar line Lp is a line of intersection at which the epipolar plane and the projection image Ip intersect. One epipolar line Lp is determined on the projection image Ip for each of the captured pixels c in the captured image Ic.

If light is projected from a projection pixel p, reflected directly on the surface of the target object 2 located on the light path OP, and detected as a captured pixel c, the projection pixel p projecting the light is on the epipolar line Lp. In other words, direct reflection light detected as a captured pixel c is always projected from a projection pixel p on the epipolar line Lp that corresponds to the captured pixel c. Further, most of indirect reflection light (light other than direct reflection light) detected as a captured pixel c is projected from a projection pixel p that is not on the epipolar line Lp corresponding to the captured pixel c. Therefore, a corresponding projection pixel pn is extracted from among projection pixels p that are on the epipolar line Lp. Thus, inappropriate projection pixels p corresponding to indirect reflection light are efficiently excluded, and an appropriate corresponding projection pixel pn is identified.

In one or more embodiments, the positional relation between the projector 20 and the image capturing device 30 is determined such that the epipolar line Lp for any of the captured pixels c is not parallel with the projection pixel rows pr or projection pixel columns pc of the projection image Ip. Especially, the positional relation between the projector 20 and the image capturing device 30 may be determined such that the epipolar line Lp for any of the captured pixels c is at a certain minimum angle or greater with respect to both the projection pixel rows pr and projection pixel columns pc of the projection image Ip. The minimum angle may be 10 degrees or greater, or more preferably, 20 degrees or greater, for example.

<Method for Identifying Corresponding Projection Pixel pn>

Following is the description of the method for identifying corresponding projection pixel(s) pn that corresponds to a captured pixel c in one or more embodiments. The outline of the method for identifying a corresponding projection pixel pn is as follows.

Firstly, the 3D shape measuring system 1 projects, on the target object 2, multiple first projection images Ipr including row-direction stripe patterns different from each other (see FIG. 6A) one by one and obtains multiple first captured images Icr (see FIG. 6B) when the respective first projection images Ipr are projected; the 3D shape measuring system 1 projects multiple second projection images Ipc including column-direction stripe patterns different from each other (see FIG. 7A) one by one and obtains multiple second captured images Icc (see FIG. 7B) when the respective second projection images Ipc are projected (first step).

Secondly, the 3D shape measuring system 1 identifies a corresponding projection pixel(s) pn that corresponds to each of the captured pixels c, based on (i) the first captured images Icr, (ii) the second captured images Icc, (iii) the projected row-direction stripe patterns, and (iv) the projected column-direction stripe patterns (second step). The second step involves identifying a corresponding pixel row(s) prx (see FIG. 8A) that corresponds to one captured pixel c from among the projection pixel rows pr, based on the multiple first captured images Icr and the multiple row-direction stripe patterns of the first projection images Ipr. The second step further involves identifying a corresponding pixel column(s) pcx (see FIG. 8B) that corresponds to the one captured pixel c from among the projection pixel columns pc, based on the multiple second captured images Icc and the multiple column-direction stripe patterns of the second projection images Ipc. The projection pixels p at the intersections of the corresponding pixel rows prx and the corresponding pixel columns pcx are referred to as candidate projection pixels px (see FIG. 8C). The second step further involves finding a candidate projection pixel(s) px that satisfies the epipolar constraint from among the candidate corresponding projection pixels pn. The second step then identifies a corresponding projection pixel pn that corresponds to the one captured pixel c from among the candidate projection pixel(s) px that satisfies the epipolar constraint.

Following is the detailed description of the respective steps.

(First Step)

Figure 6A:
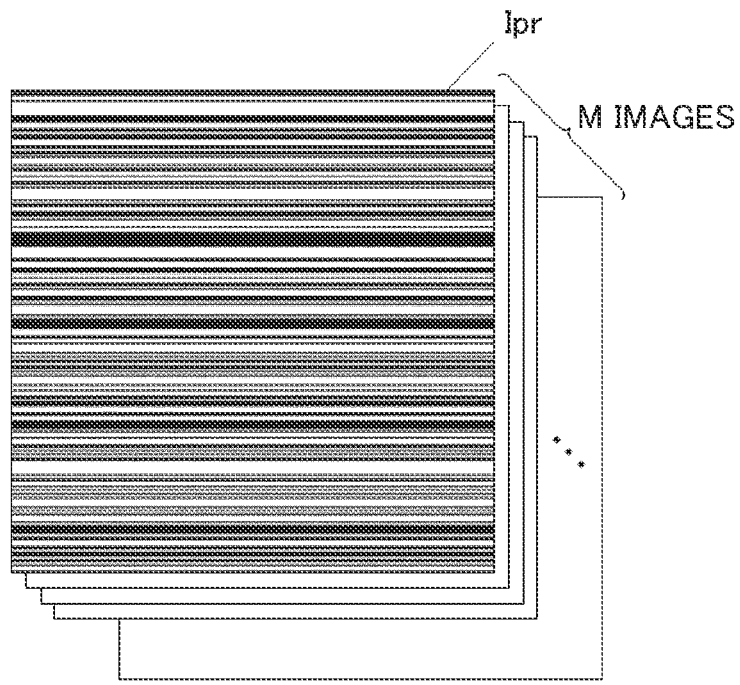
FIG. 6A shows first projection images.
Figure 6B:
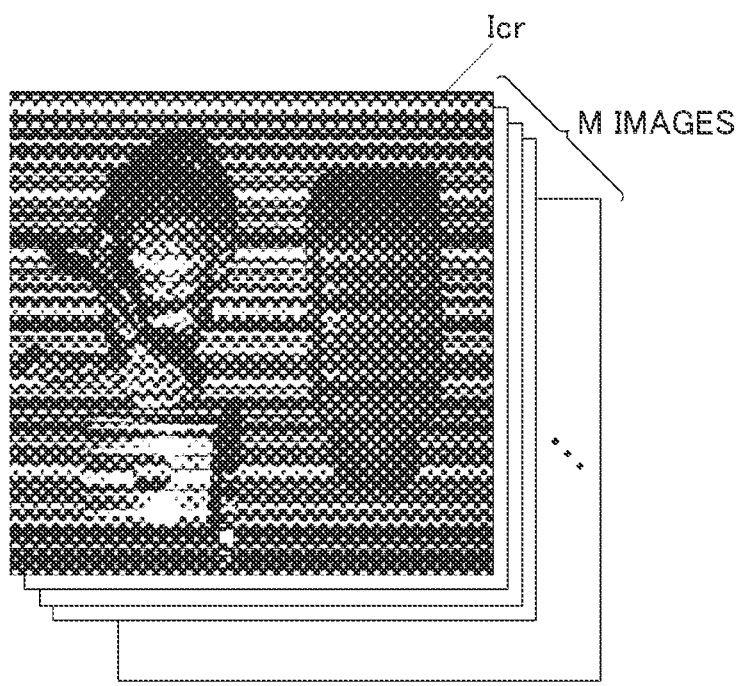
FIG. 6B shows first captured images.

FIGS. 6A, 6B show the first projection images Ipr and the first captured images Icr.

As shown in FIG. 6A, the first projection images Ipr each include a row-direction stripe pattern in which projection pixel rows pr are randomly on (black) or off (white). In the first step, M first projection images Ipr having different row-direction stripe patterns are projected on the target object 2 one by one in order. When the respective first captured images Icr are projected, the first captured images Icr shown in FIG. 6B are captured and obtained one by one. Thus, in the first step, M first captured images Icr corresponding to the M first projection images Ipr are obtained.

Figure 7A:
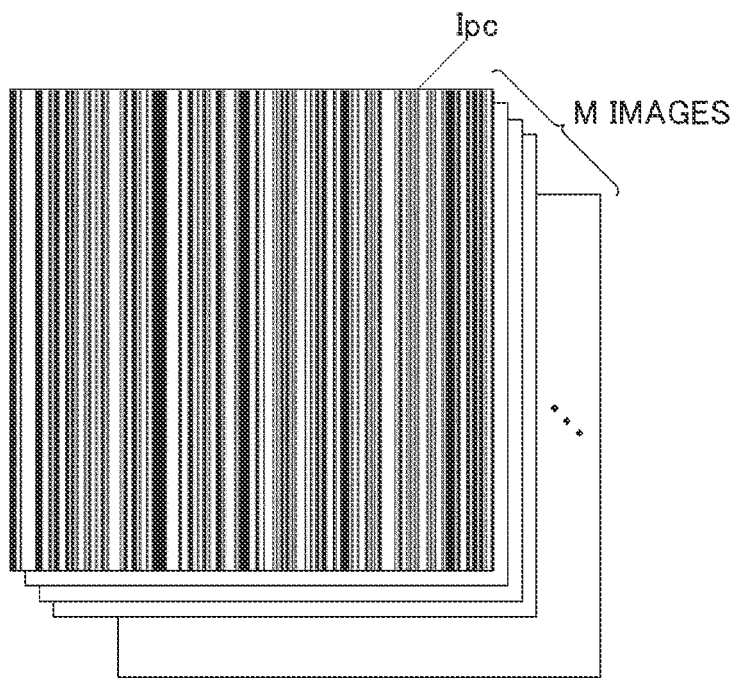
FIG. 7A shows second projection images.
Figure 7B:
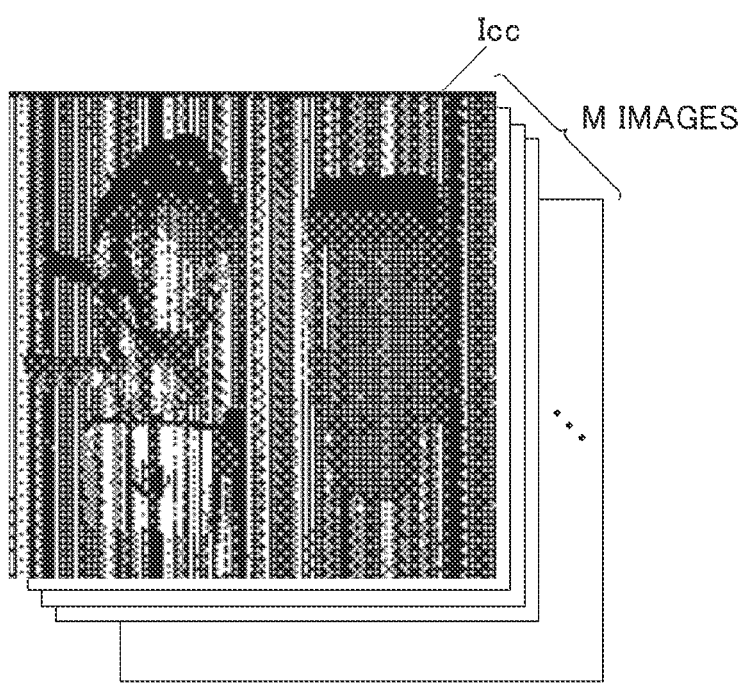
FIG. 7B shows second captured images.

FIGS. 7A, 7B show the second projection images Ipc and the second captured images Icc.

As shown in FIG. 7A, the second projection images Ipc each include a column-direction stripe pattern in which projection pixel columns pc are randomly on (black) or off (white). In the first step, M second projection images Ipc having different column-direction stripe patterns are projected on the target object 2 one by one in order. When the respective second projection images Ipc are projected, the second captured images Icc shown in FIG. 7B are captured and obtained one by one. Thus, in the first step, M second captured images Icc corresponding to the M second projection images Ipc are obtained.

The projection order of the first projection images Ipr and the second projection images Ipc, namely the capturing order of the first captured images Icr and the second captured images Icc, may be determined as desired.

The column-direction stripe patterns of the respective second projection images Ipc are the row-direction stripe patterns of the respective first projection images Ipr rotated through 90 degrees. That is, the column-direction stripe patterns of the respective second projection images Ipc are the same as the row-direction stripe patterns of the respective first projection images Ipr except the directions of the patterns. However, the patterns are not limited to them. The column-direction stripe patterns of the second projection images Ipc may be at least partly different from the row-direction stripe patterns of the first projection images Ipr.

(Second Step)

In the second step, the 3D shape measuring system 1 identifies corresponding pixel row(s) prx for each of the captured pixels c, based on the multiple first captured images Icr and the multiple row-direction stripe patterns of the first projection images Ipr by applying sparse optimization (sparse estimation); and the 3D shape measuring system 1 identifies corresponding pixel column(s) pcx for each of the captured pixels c, based on the second captured images Icc and the column-direction stripe patterns of the second projection images Ipc by applying sparse optimization (sparse estimation).

Following is the description of the method for identifying the corresponding pixel rows prx by applying sparse optimization. Herein, $p_m$ (Expression (1-1)) is the pattern vector that describes the row-direction stripe pattern of the m-th first projection image Ipr ($1 \leq m \leq M$); and $c_m$ (Expression 1-2) is the captured pixel vector that describes the content of the first captured image Icr corresponding to the m-th first projection image Ipr. The pattern vector $p_m$ is an N-dimensional vector. The elements of the pattern vector $p_m$ indicate on/off of the respective N projection pixel rows pr in the first projection image Ipr. The captured pixel vector $c_m$ is an N×N ($N^2$) dimensional vector. The elements of the captured pixel vector $c_m$ indicate on/off of the respective $N^2$ captured pixels c in the first captured image Icr.

$$p_m \in \mathbb{R}^N \qquad (1\text{-}1)$$

$$c_m \in \mathbb{R}^{N^2} \qquad (1\text{-}2)$$

C in Expression (1-3) is the captured image matrix that describes the M captured pixel vectors $c_m$ corresponding to the M first captured images Icr. P in Expression (1-4) is the projection pattern matrix that describes the M pattern vectors $p_m$ corresponding to the M first projection images Ipr. The matrices C and P satisfy the Expression (1-5). Herein, the matrix W in the Expression (1-5) is an LTM that indicates correspondences between projection pixel rows pr and the captured pixels c (i.e., indicates which of the light components from the projection pixel rows pr is detected as each of the captured pixels c). As shown in Expression 1-6, the matrix W is an N×$N^2$ dimensional matrix.

$$C = [c_1, \ldots, c_M] \qquad (1\text{-}3)$$

$$P = [p_1, \ldots, p_M] \qquad (1\text{-}4)$$

$$C = WP \qquad (1\text{-}5)$$

$$W \in \mathbb{R}^{N^2 \times N} \qquad (1\text{-}6)$$

Normally, only a small part of N projection pixel rows pr corresponds to one captured pixel c. The matrix W is therefore sparse (the matrix W has many zero elements). The sparse matrix W that satisfies Expression (1-5) can be calculated by applying an algorithm for numerically solving a LASSO (least absolute shrinkage and selection operator) minimization problem (L1 norm regularization problem). Specifically, the algorithm applied here is an algorithm that numerically solves a LASSO minimization problem based on a proximal gradient method and that uses the alternating direction method of multipliers (ADMM).

The algorithm for calculating the matrix W is described in detail below. Herein, $A_1$, $A_2$, $A_3$, x, y, z and t are $N^2 \times N$ matrices. The transpose of the projection pattern matrix P is denoted as a matrix A.

As preprocessing, calculation and substitution of Expressions (2-1) to (2-5) is performed. Calculation of Expressions (2-1) to (2-5) can be done once the M row-direction stripe patterns of the first projection images Ipr are known. Therefore, by performing the preprocessing with Expressions (2-1) to (2-5) before measuring the 3D shape of the target object 2, the measuring time can be shortened.

$$A_1 \leftarrow \frac{1}{\mu\lambda} A^\top \left( I + \frac{1}{\mu\lambda} A A^\top \right)^{-1} \qquad (2\text{-}1)$$

$$A_2 \leftarrow \frac{1}{\mu\lambda} (A^\top - A_1 A A^\top) \qquad (2\text{-}2)$$

$$A_3 \leftarrow A_1 A \qquad (2\text{-}3)$$

$$z \leftarrow 0 \qquad (2\text{-}4)$$

$$t \leftarrow 0 \qquad (2\text{-}5)$$

When 3D measurement of the target object 2 starts, online processing starts for identifying the corresponding pixel rows prx. In the online processing, calculation and substitution of Expressions (3-1) to (3-2) is firstly performed after the M first projection images Ipr are projected; the M first projection images Ipr are obtained; and the captured image matrix C is determined.

$$y \leftarrow A_2 C^T \qquad (3\text{-}1)$$

$$x \leftarrow y \qquad (3\text{-}2)$$

Next, calculation of Expressions (3-3) to (3-6) is iterated for a variable i while incrementing the variable i from 1 to 100. The right hand of Expression (3-3) is a Soft Thresholding Function. When the absolute value of an input x exceeds a threshold (1/μ), the Soft Thresholding Function outputs the absolute value of the excess. Through the loop processing of Expressions (3-3) to (3-6), the matrix W converges to a sparse LTM. The upper limit of the variable i is not limited to 100 but may be a variable that is determined depending on the calculation status, for example. The online processing for identifying the corresponding pixel rows prx ends when the loop processing of Expressions (3-3) to (3-6) ends.

$$\text{For } i = 1:100 \quad (3\text{-}3)$$

$$z \leftarrow \text{Softthr}\left(x; \frac{1}{\mu}\right)$$

$$t \leftarrow 2z - x \quad (3\text{-}4)$$

$$x \leftarrow y + z - A_3 t \quad (3\text{-}5)$$

$$W^\top \leftarrow x + t - z \quad (3\text{-}6)$$

The matrix W (LTM) calculated in the above algorithm describes corresponding pixel rows prx that correspond to the respective captured pixels c. Once the matrix W is calculated by the above loop processing, the corresponding pixel row(s) prx for every captured pixel c can be identified. This is because the matrix A, namely the projection pattern matrix P, is common for all the captured pixels c.

Figure 8A:
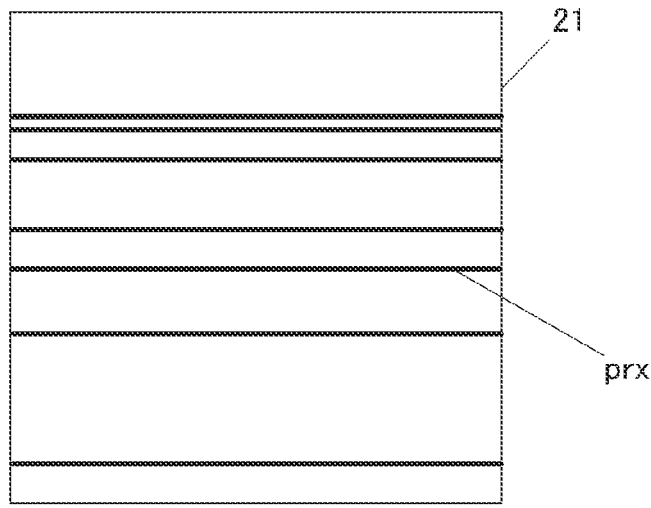
FIG. 8A shows an example of corresponding pixel rows.

FIG. 8A shows an example of the corresponding pixel rows prx that correspond to a captured pixel c. Although one captured pixel c basically corresponds to one corresponding pixel row prx, there may also be a corresponding pixel row prx extracted based on indirect reflection light. Therefore, there may be multiple corresponding pixel rows prx. In the example shown in FIG. 8A, seven corresponding pixel rows prx are identified.

The corresponding pixel columns pcx are identified by the same method of identifying the corresponding pixel rows prx. The above method of identifying the corresponding pixel rows prx can also be applied to identifying the corresponding pixel columns pcx by replacing "first projection image(s) Ipr" with "second projection image(s) Ipc"; "first captured image(s) Icr" with "second captured image(s) Icc"; "projection pixel row(s) pr" with "projection pixel column(s) pc"; and "corresponding pixel row(s) prx" with "corresponding pixel column(s) pcx". As described above, the column-direction stripe patterns of the second projection images Ipc are the same as the row-direction stripe patterns of the first projection images Ipr except the pattern directions. Therefore, the matrix A (i.e., projection pattern matrix P) used for identifying the corresponding pixel rows prx can also be used for identifying the corresponding column rows pcx. Therefore, the preprocessing is the same. By performing the online processing of Expressions (3-1) to (3-6) with the captured image matrix C based on the multiple second captured images Icc, the corresponding pixel columns pcx can be identified. In the following, the matrix W that describes the corresponding pixel rows prx is also referred to as "matrix Wr", and the matrix W that shows the corresponding pixel columns pcx is also referred to as "matrix Wc". The matrix Wr and the matrix Wc, which show the corresponding pixel rows prx and the corresponding pixel columns pcx, respectively, may also be referred to as "LineLTM".

Figure 8B:
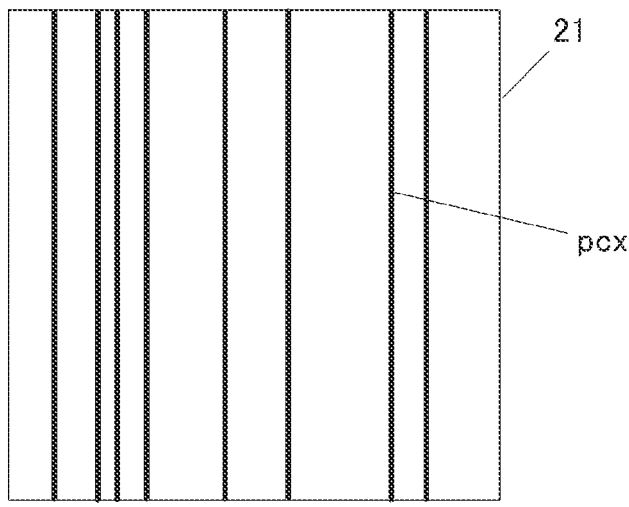
FIG. 8B shows an example of corresponding pixel columns.

FIG. 8B shows an example of the corresponding pixel columns pcx that correspond to a captured pixel c. Although one captured pixel c basically corresponds to one corresponding pixel column pcx, there may also be a corresponding pixel column pcx extracted based on indirect reflection light. Therefore, there may be multiple corresponding pixel columns pcx. In the example shown in FIG. 8B, eight corresponding pixel columns pcx are identified.

Figure 8C:
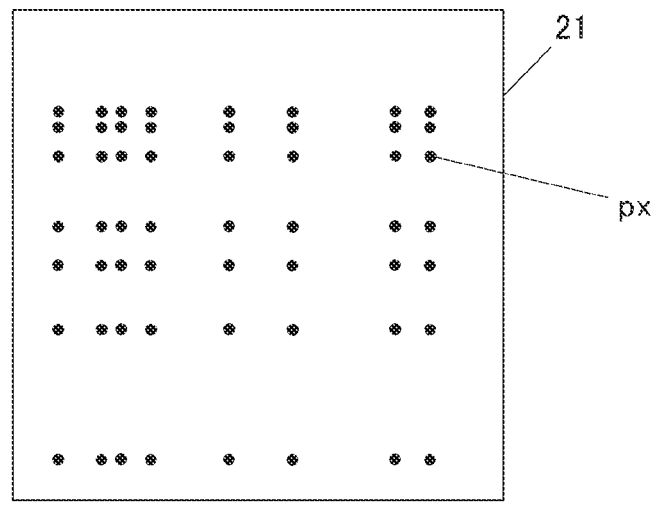
FIG. 8C shows an example of candidate projection pixels.

After the corresponding pixel rows prx and the corresponding pixel columns pcx are identified for every captured pixel c, the projection pixels p at the intersections of the corresponding pixel rows prx and the corresponding pixel columns pcx are identified as candidate projection pixels px for the captured pixel c, as shown in FIG. 8C. These intersections are direct products of a set of corresponding pixel rows prx and a set of corresponding pixel columns pcx. The intersections correspond to non-zero combinations (products) among the combinations (combinations) of (i) elements of the matrix Wr corresponding to a captured pixel c and (ii) elements of the matrix Wc corresponding to the captured pixel c. A product (combination) that is equal to or less than a predetermined minute value may be excluded from the products of (i) and (ii). When there are multiple corresponding pixel rows prx or multiple corresponding pixel column pcx, multiple candidate projection pixels px are identified. In the example shown in FIG. 8C, 56 candidate projection pixels px are identified.

From among the identified candidate projection pixels px, a candidate projection pixel(s) px that satisfies the epipolar constraint is extracted and identified as a corresponding projection pixel(s) pn that corresponds to the captured pixel c. To extract the corresponding projection pixel(s) pn that satisfies the epipolar constraint, the following first extraction method or second extraction method is performed.

Figure 9:
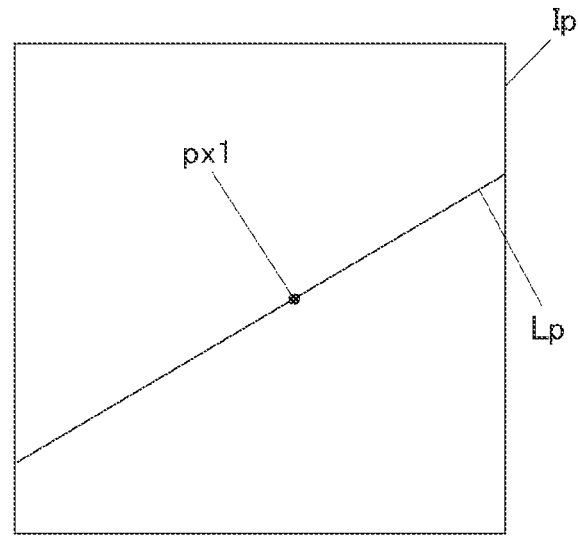
FIG. 9 is a figure to explain a first extraction method to extract a corresponding projection pixel that satisfies the epipolar constraint.

FIG. 9 is a figure to explain the first extraction method to extract the corresponding projection pixel(s) pn that satisfies the epipolar constraint.

In the first extraction method, a candidate projection pixel(s) px that is on the epipolar line Lp on the projection image Ip is extracted as the corresponding projection pixel pn that satisfies the epipolar constraint. For example, when the epipolar line Lp passes through a region of a projection pixel p, the projection pixel p can be determined as the projection pixel p that is on the epipolar line Lp. FIG. 9 shows one candidate projection pixel px1 that is on the epipolar line Lp, among the 56 candidate projection pixels px shown in FIG. 8C.

Figure 10:
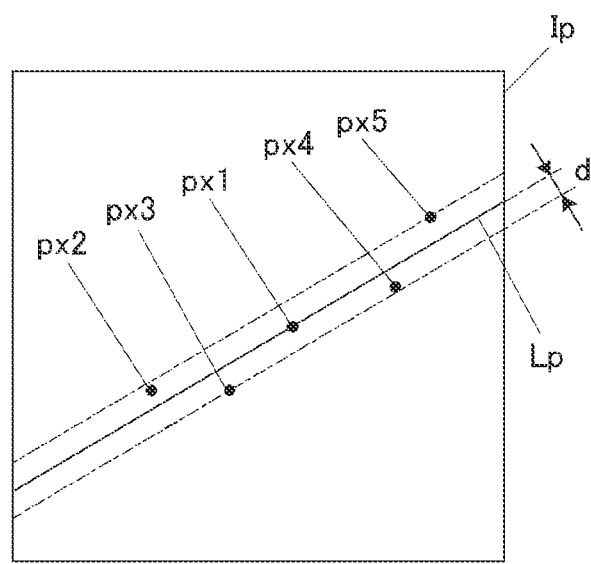
FIG. 10 is a figure to explain a second extraction method to extract a corresponding projection pixel(s) that satisfies the epipolar constraint.

FIG. 10 is a figure to explain the second extraction method to extract the corresponding projection pixel(s) pn that satisfies the epipolar constraint.

In the second extraction method, the corresponding projection pixel(s) pn that satisfies the epipolar constraint is extracted from the candidate projection pixels px that are within a certain distance [d] from the epipolar line Lp on the projection image Ip. FIG. 10 shows five candidate projection pixel px1 to px5 that are within the distance d from the epipolar line Lp, among the 56 candidate projection pixels px shown in FIG. 8C. The distance d may be a predetermined number of times greater than the interval at which the projection pixels p are arranged in the first projection images Ipr. The distance d can be determined depending on the desired measuring accuracy or the like. For example, the distance d can be a few times greater than the interval at which the projection pixels p are arranged. The position of each projection pixel p may be represented by the center of the rectangular region of each projection pixel p, for example.

The second extraction method may be rephrased as the method of (i) setting the width of the epipolar line Lp to 2d and (ii) extracting the corresponding projection pixel(s) pn that satisfies the epipolar constraint from among the candidate projection pixels px that are on the epipolar line Lp having the 2d width.

In the second extraction method, all the candidate projection pixels px that are within the distance d from the epipolar line Lp may be determined as the corresponding projection pixels pn that satisfy the epipolar constraint.

In the second extraction method, a candidate projection pixel px may be further extracted from the candidate projection pixels px that are within the distance d from the epipolar line Lp by applying a certain extraction method, and the extracted candidate projection pixel px may be determined as the corresponding projection pixel pn. For example, the candidate projection pixels px may be given evaluation values such that a candidate projection pixel px closer to the epipolar line Lp has a greater weight, and the corresponding projection pixel pn may be identified based on the evaluation values. Specifically, the candidate projection pixel px having the greatest evaluation value may be identified as the corresponding projection pixel pn. For another example, the candidate projection pixel px having the evaluation value equal to or greater than a predetermined reference value may be identified as the corresponding projection pixel pn. For another example, an evaluation value may be the weight itself, or an evaluation value may be a value obtained by multiplying (i) a basic value that is the product of an element of the matrix Wr and an element of the matrix Wc and (ii) a weight.

Figure 11:
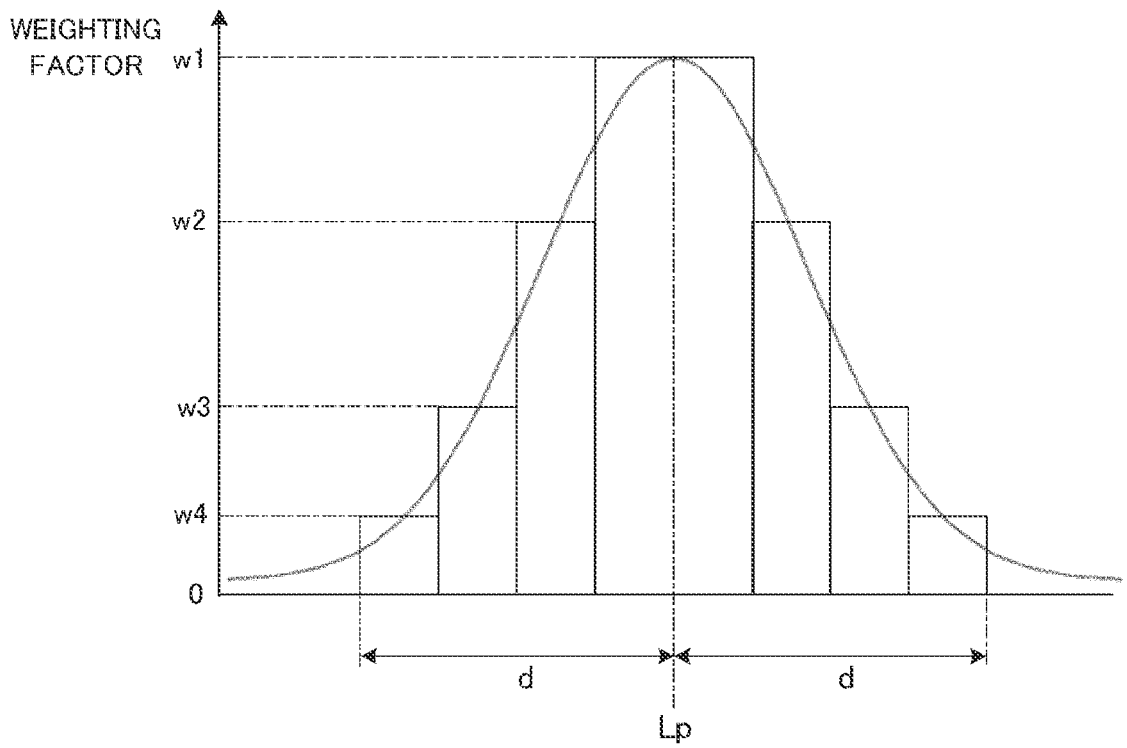
FIG. 11 shows an example of weighting evaluation values.

FIG. 11 shows an example of weighting in determining the evaluation values.

In the example shown in FIG. 11, the weight w1 for the candidate projection pixel px on the epipolar line Lp is greatest, and weights gradually decrease to w2, w3, to w4 by steps so as to follow a normal distribution as the candidate projection pixels px are farther from the epipolar line Lp. Specifically, when the distance between a candidate projection pixel px and the epipolar line Lp is equal to or less than d/4, the candidate projection pixel px is given an evaluation value with the weight w1. When the distance between a candidate projection pixel px and the epipolar line Lp is greater than d/4 and equal to or less than d/2, the candidate projection pixel px is given an evaluation value with the weight w2 (<w1). When the distance between a candidate projection pixel px and the epipolar line Lp is greater than d/2 and equal to or less than 3d/4, the candidate projection pixel px is given an evaluation value with the weight w3 (<w2). When the distance between a candidate projection pixel px and the epipolar line Lp is greater than 3d/4 and equal to or less than d, the candidate projection pixel px is given an evaluation value with the weight w4 (<w3). By the above-described weighting, a candidate projection pixel px closer to the epipolar line Lp can be preferentially extracted as the corresponding projection pixel pn.

The range within which the same weight is given is not limited to d/4. The weights may be determined so as to follow a rule different from a normal distribution.

The step of extracting the candidate projection pixel px that satisfies the epipolar constraint may be omitted when there is only one candidate projection pixel px, which is the intersection of the corresponding pixel row prx and the corresponding pixel column pcx. Alternatively, the step of extracting the candidate projection pixel px that satisfies the epipolar constraint may be performed even when there is only one candidate projection pixel px, on the assumption that the one candidate projection pixel px can be based on indirect reflection light.

<3D Shape Measuring Process>

Next, the 3D shape measuring process to be performed by the 3D shape measuring apparatus 10 is described. The process is controlled by the CPU 11.

Figure 12:
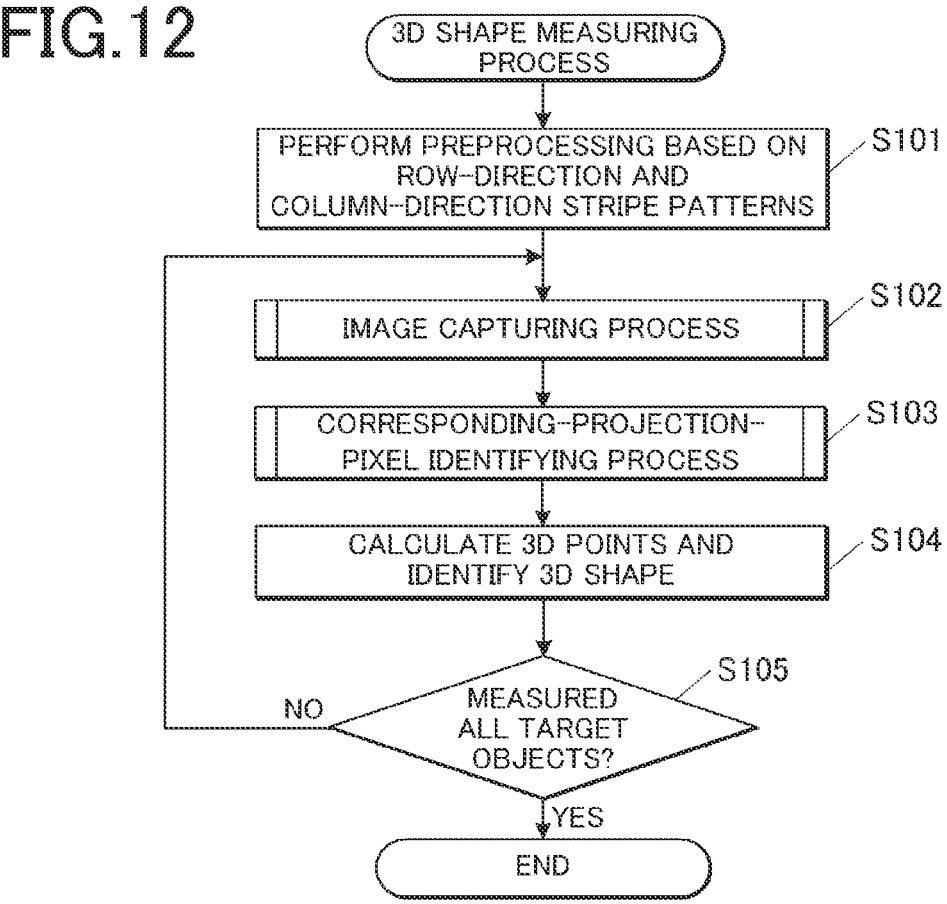
FIG. 12 is a flowchart of a 3D shape measuring process.

FIG. 12 is a flowchart of the 3D shape measuring process.

When the 3D shape measuring process starts, the CPU 11 identifies the projection pattern matrix P (matrix A) based on the row-direction stripe patterns of the first projection images Ipr and the column-direction stripe patterns of the second projection images Ipc, and performs the preprocessing (Step S101). As the preprocessing, the CPU 11 performs calculation and substitution of Expressions (2-1) to (2-5). After finishing the preprocessing, the CPU 11 performs an image capturing process (Step S102).

Figure 13:
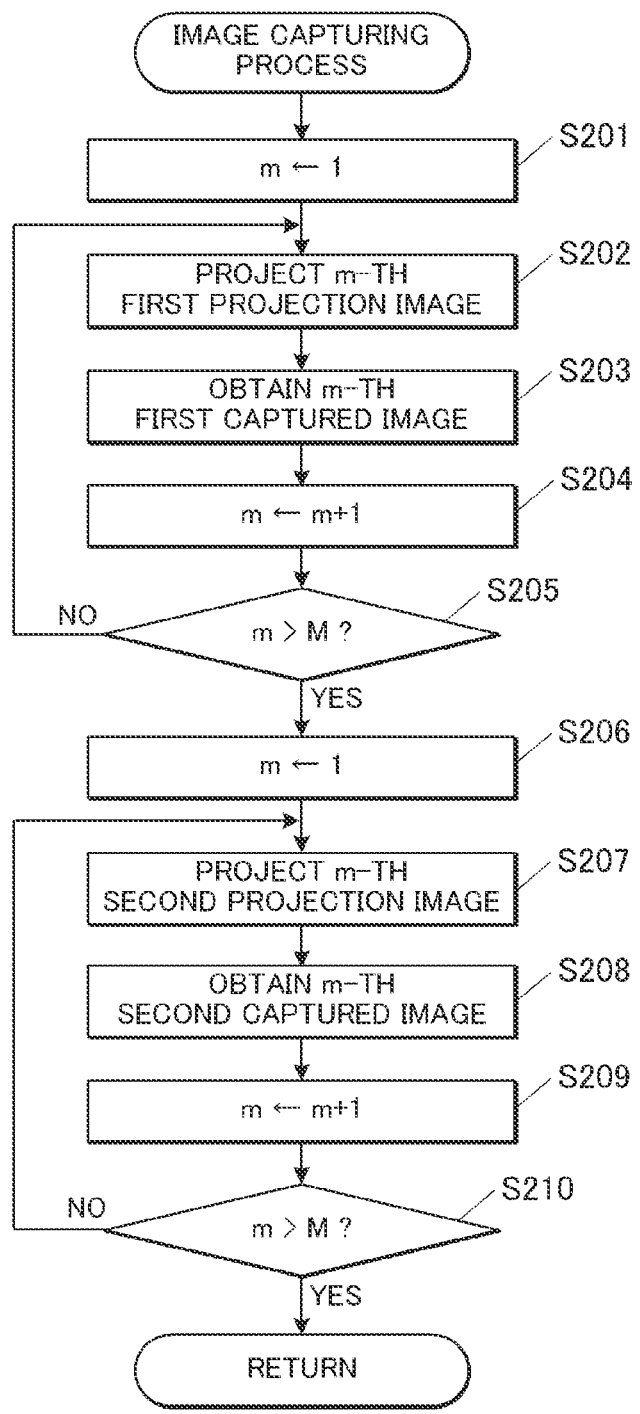
FIG. 13 is a flowchart of an image capturing process.

FIG. 13 is a flowchart of the image capturing process.

When the image capturing process is called, the CPU 11 substitutes "1" for a variable m (Step S201). The CPU 11 sends a control signal to the projector 20 and causes the projector 20 to project the m-th first projection image Ipr on the target object 2 (Step S202). The CPU 11 sends a control signal to the image capturing device 30 at the same time as the projection of the first captured image Icr and causes the image capturing device 30 to capture and obtain the m-th first captured image Icr (Step S203).

The CPU 11 substitutes "m+1" for the variable m (Step S204) and determines whether the variable m is greater than M (Step S205). When determining that the variable m is equal to or less than M (i.e., all the M first captured images Icr have not been obtained yet) (Step S205: NO), the CPU 11 returns to Step S202.

When determining that the variable m is greater than M (i.e., all the M first captured images Icr have been obtained) (Step S205: YES), the CPU 11 substitutes "1" for the variable m (Step S206). The CPU 11 sends a control signal to the projector 20 and causes the projector 20 to project the m-th second projection image Ipc on the target object 2 (Step S207). The CPU 11 sends a control signal to the image capturing device 30 at the same time as the projection of the second projection image Ipc and causes the image capturing device 30 to capture the m-th second captured image Icc (Step S208).

The CPU 11 substitutes "m+1" for the variable m (Step S209) and determines whether the variable m is greater than M (Step S210). When determining that the variable m is equal to or less than M (i.e., all the M second captured images Icc have not been obtained yet) (Step S210: NO), the CPU 11 returns to Step S207. When determining that the variable m is greater than M (i.e., all the M second captured images Icc have been obtained) (Step S210: YES), the CPU 11 ends the image capturing process and returns to the 3D shape measuring process.

After finishing the image capturing process in the flow of FIG. 12, the CPU 11 performs a corresponding-projection-pixel identifying process (Step S103).

Figure 14:
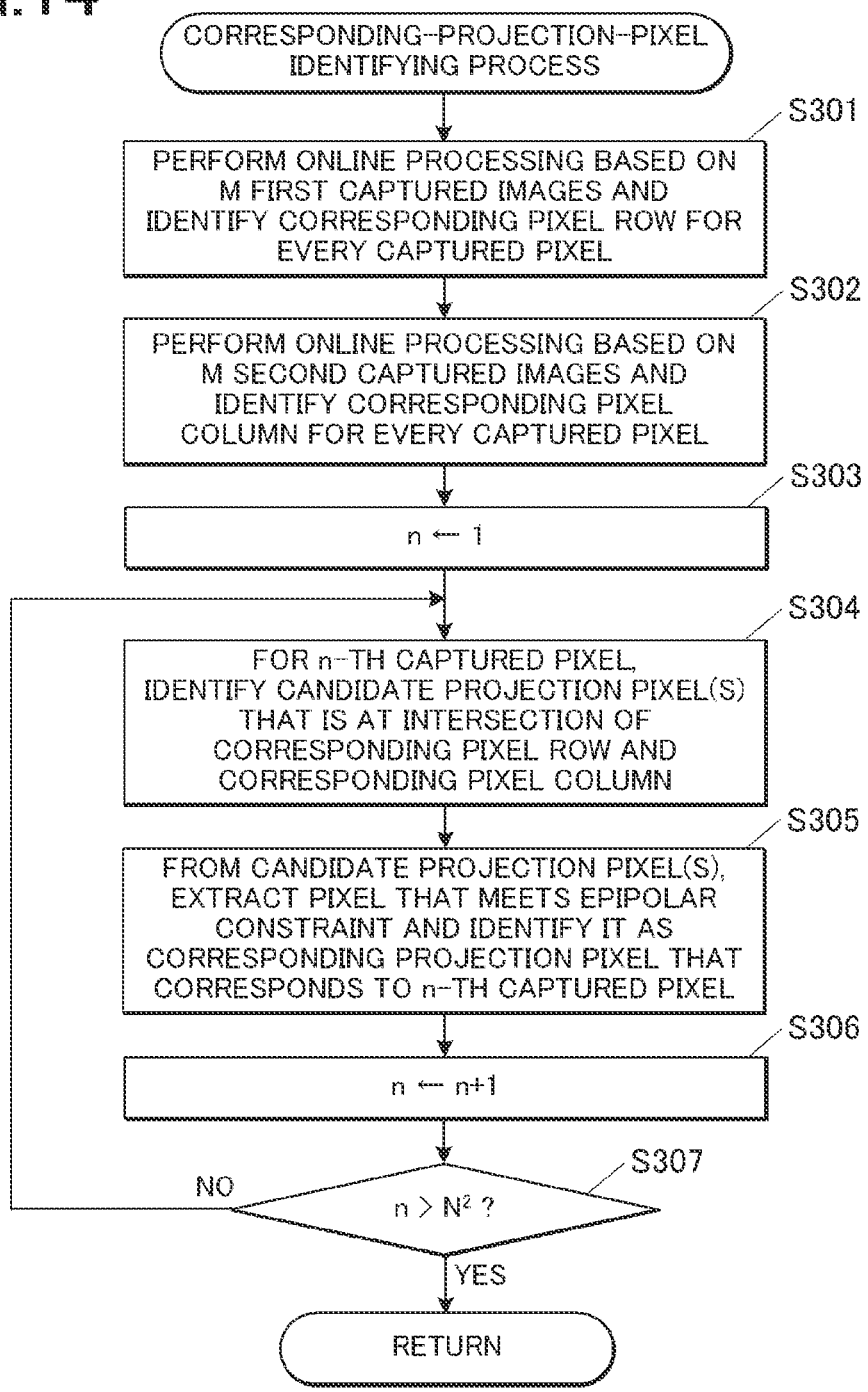
FIG. 14 is a flowchart of a corresponding-projection-pixel identifying process.

FIG. 14 is a flowchart of the corresponding-projection-pixel identifying process.

When the corresponding-projection-pixel identifying process is called, the CPU 11 performs the above-described online processing based on the M first captured images Icr and identifies the corresponding pixel row(s) prx for every captured pixel c (Step S301). Herein, the CPU 11 identifies the captured image matrix C based on the M first captured images Icr, and performs calculation and substitution of Expressions (3-1) and (3-2). The CPU 11 iterates the calculation of Expressions (3-3) to (3-6) while incrementing a variable i, and obtains the matrix W (matrix Wr, LTM).

The CPU 11 performs the above-described online processing based on the M second captured images Icc and identifies the corresponding pixel column(s) pcx for every captured pixel c (Step S302). Herein, the CPU 11 identifies the captured image matrix C based on the M second captured images Icc, and performs calculation and substitution of Expressions (3-1) and (3-2). The CPU 11 iterates the calculation with Expressions (3-3) to (3-6) while incrementing a variable i to obtain the matrix W (matrix Wc, LTM).

Steps S301 and S302 may be performed simultaneously.

The CPU 11 substitutes "1" for a variable n (Step S303). For the n-th captured pixel c, the CPU 11 identifies a candidate projection pixel(s) px (Step S304). The candidate projection pixel px corresponds to the intersection of the corresponding pixel row prx and the corresponding pixel column pcx. From among the identified candidate projection pixel(s) px, the CPU 11 extracts a candidate projection pixel px that satisfies the epipolar constraint, and identifies the extracted candidate projection pixel px as the corresponding projection pixel pn that corresponds to the n-th captured pixel c (Step S305).

The CPU 11 substitutes "n+1" for the variable n (Step S306) and determines whether the variable n is greater than $N^2$ (Step S307). When determining that the variable n is equal to or less than $N^2$ (i.e., the corresponding projection pixel pn has not been identified yet for any of the captured pixels c) (Step S307: NO), the CPU 11 returns to Step S304. Steps S304 and S305 for the respective variables n may be performed simultaneously.

When determining that the variable n is greater than $N^2$ (i.e., the corresponding projection pixel pn has been identified for every captured pixel c) (Step S307: YES), the CPU 11 ends the corresponding-projection-pixel identifying process and returns to the 3D shape measuring process.

After finishing the corresponding-projection-pixel identifying process in the flow shown in FIG. 12, the CPU 11 calculates 3D points of the target object 2 by using the triangulation based on the correspondences between the captured pixels c and the corresponding projection pixels pn, and identifies the 3D shape of the target object 2 (Step S104). The CPU 11 also generates 3D shape data of the identified 3D shape and stores the data in the storage 13.

The CPU 11 determines whether every target object 2 has been measured (Step S105). When determining that there is a target object 2 that has not been measured yet (Step S105: NO), the CPU 11 returns to Step S102 and starts 3D shape measurement for the next target object 2. Herein, the pre-processing in Step S101 can be omitted.

When determining that every target object 2 has been measured (Step S105: YES), the CPU 11 ends the 3D shape measuring process.

In the above 3D shape measuring process, Step S102 corresponds to the first step/first process; Steps S101 and S103 correspond to the second step/second process; and Step S104 corresponds to the third step/third process.

<Advantageous Effects as Compared with Comparative Example>

Next, the advantageous effects of one or more embodiments are described as compared with a conventional LTM method that uses projection images having random patterns. The conventional LTM method obtains an LTM that shows all the correspondences between captured pixels and projection pixels by applying sparse estimation, based on multiple captured images corresponding to multiple projection images that have random patterns (patterns of projection images in which each pixel has a random pixel value), and extracts a correspondence that satisfies the epipolar constraint from among the obtained correspondences. Hereinafter, the conventional LTM calculation method is described. Herein, $p_m$ (Expression (4-1)) is the pattern vector that describes the random pattern of the m-th projection image ($1 \leq m \leq M$); and $c_m$ (Expression (4-2)) is the captured pixel vector that describes the content of the captured image corresponding to the m-th projection image. The pattern vector $p_m$ in the comparative example is an N×N ($N^2$) dimensional vector. The elements of the pattern vector $p_m$ indicate on/off of the respective $N^2$ projection pixels in the projection image. The captured pixel vector $c_m$ in the comparative example is an N×N ($N^2$) dimensional vector. The elements of the captured pixel vector $c_m$ indicate on/off of the respective $N^2$ captured pixels in the captured image.

$$p_m \in \mathbb{R}^{N^2} \qquad (4\text{-}1)$$

$$c_m \in \mathbb{R}^{N^2} \qquad (4\text{-}2)$$

C in Expression (4-3) is the captured image matrix that describes the M captured pixel vectors $c_m$ corresponding to the M captured images. P in Expression (4-4) is the projection pattern matrix that describes the M pattern vectors $p_m$ corresponding to the M projection images. The matrices C and P satisfy the Expression (4-5). Herein, the matrix W in the Expression (4-5) is an LTM that indicates correspondences between the projection pixels and the captured pixels (i.e., indicates which of the light components from the projection pixels is detected as each of the captured pixels). As shown in Expression (4-6), the matrix W in the comparative example is an $N^2 \times N^2$ dimensional matrix. As with the above embodiments, the matrix W is sparse.

$$C = [c_1, \ldots, c_M] \qquad (4\text{-}3)$$

$$P = [p_1, \ldots, p_M] \qquad (4\text{-}4)$$

$$C = WP \qquad (4\text{-}5)$$

$$W \in \mathbb{R}^{N^2 \times N^2} \qquad (4\text{-}6)$$

Each row of the captured image matrix C is denoted as $C_j$, and each row of the matrix W (LTM) is denoted as $W_j$. The transpose of $C_j$ and the transpose of $W_j$ satisfy Expression (4-7).

$$C_j^T = P^T W_j^T \qquad (4\text{-}7)$$

The transpose of $W_j$ shows projection pixels that correspond to one captured pixel. The transpose of $W_j$ (vector x) can be identified by solving the problem shown as Expression (4-8), namely by solving a LASSO minimization problem (L1 norm regularization problem).

$$\operatorname*{argmin}_{x} \left( \|x\|_1 + \frac{1}{2\lambda} \|y - Ax\|_2^2 \right) \qquad (4\text{-}8)$$

where $y \leftarrow C_j^T, A \leftarrow P^T, x \leftarrow W_j^T$

The vector x that satisfies Expression (4-8) can be calculated by applying the following known algorithm that numerically solves a LASSO minimization problem by using a proximal gradient method and that uses the ADMM. In this algorithm, calculation of Expressions (4-9) to (4-11) is iterated for a variable i while incrementing the variable i from 1 to 100, to obtain the sparse vector x.

$$\text{For } i = 1{:}100 \qquad (4\text{-}9)$$

-continued $$x \leftarrow \left(\frac{1}{\lambda}A^\top A + \mu I\right)^{-1}\left(\frac{1}{\lambda}A^\top y + \mu z - h\right)$$

$$z \leftarrow \mathit{Softthr}\left(x + \frac{1}{\mu}h; \frac{1}{\mu}\right) \quad (4\text{-}10)$$

$$h \leftarrow h + \mu(x - z) \quad (4\text{-}11)$$

According to the conventional LTM method, the loop processing of Expressions (4-9) to (4-11) needs to be performed for every captured pixel in order to identify a corresponding projection pixel for every captured pixel. Further, in the multiscale LT Matrix estimation method, in which the resolution of the projection image is changed in steps to simplify the later calculation, the matrix A (projection pattern matrix P) needs to be reconstructed each time based on the previous estimation result. Therefore, the previous calculation and the later calculation are not independent, and the previous calculation should be followed by the later calculation. This requires long computing time.

On the other hand, one or more embodiment do not require the multiscale LT Matrix estimation, and the matrix A (projection pattern matrix P) is common for all the captured pixels. Accordingly, matrix operations with Expressions (3-3) to (3-6) can be parallelized, for example.

Further, the processing for identifying corresponding pixel rows prx and the processing for identifying corresponding pixel columns pcx can also be parallelized. Since the same matrix A (projection pattern matrix P) is used in the operation for identifying the corresponding pixel rows prx and the operation for identifying the corresponding pixel columns pcx, these operations can be easily parallelized.

Such parallel operation for calculating the matrix W may be installed to a graphics processing unit (GPU) to further accelerate the operation.

FIG. 15 shows measurement results of LTM calculation times in one or more embodiments and the comparative example by a CPU.

FIG. 15 shows measured calculation times for calculating the matrix W (LTM) for samples 1 to 4 as the target object 2 by one or more embodiments and the comparative example. The result of one or more embodiments is the total of the time for calculating the matrix Wr and the time for calculating the matrix We by the CPU 11. The samples 1 and 2 are resin members having light permeability, and the samples 3 and 4 are shiny metal members. The average of calculation times for the samples 1 to 4 was calculated for one or more embodiments and the comparative example.

As shown in the measurement results in FIG. 15, the average calculation time by the application of one or more embodiments was 4.3 seconds, whereas the average calculation time by the application of the comparative example was 7.1 seconds. Thus, it has been observed that the method of one or more embodiments, which can easily parallelize operations, reduces the calculation time by approximately 40% as compared with the method of the comparative example.

The above calculation times are yielded by a CPU. It has been observed that the calculation time is equal to or less than one second when the operations of one or more embodiments are parallelized by a GPU.

<Modification>

Next, a modification of the above embodiments is described. This modification uses a different method from the above embodiments in identifying the corresponding pixel rows prx and the corresponding pixel columns pcx for one captured pixel. Hereinafter, the aspects of the modification different from the above embodiments are described, and the aspects in common with the above embodiments are not described.

FIG. 16A shows first projection images Ipr, and FIG. 16B shows second projection images Ipc in the modification.

As shown in FIG. 16A, the first projection images Ipr in this modification include row-direction stripe patterns different from each other. In this modification, projection pixels p of the first projection images Ipr may have multi-step pixel values (different multiple gradation values). The row-direction stripe patterns of the multiple first projection images Ipr are determined such that the portions corresponding to the respective projection pixel rows pr in the row-direction stripe patterns change at different frequencies depending on the projection pixel row pr (hereinafter called first frequencies) when the first to m-th first projection images Ipr are projected in order. Specifically, the row-direction stripe patterns (pixel values of the respective projection pixels p in the respective first projection images Ipr) are determined such that the first frequencies in the first to N-th projection pixel rows pr are frequencies $f_1$ to $f_N$, respectively. The first frequencies $f_1$ to $f_N$ may not be in ascending order or descending order, as long as they are different from each other.

As shown in FIG. 16B, the second projection images Ipc in this modification include column-direction stripe patterns different from each other. In this modification, projection pixels p in the second projection images Ipc may have multi-step pixel values (different multiple gradation values). The column-direction stripe patterns of the multiple second projection images Ipc are determined such that the portions corresponding to the respective projection pixel columns pc in the column-direction stripe patterns change at different frequencies depending on the projection pixel column pc (hereinafter called second frequencies) when the first to M-th second projection images Ipc are projected in order. Specifically, the column-direction stripe patterns (pixel values of the respective projection pixels p in the respective second projection images Ipc) are determined such that the second frequencies in the first to N-th projection pixel columns pc are frequencies $f_1$ to $f_N$, respectively. The second frequencies $f_1$ to $f_N$ may not be in ascending order or descending order, as long as they are different from each other. The second frequencies $f_1$ to $f_N$ may be the same as the first frequencies $f_1$ to $f_N$.

In the first step, the above-described first projection images Ipr and the second projection images Ipc are projected on the target object 2, and the first captured images Icr and the second captured images Icc are obtained, as with the above embodiments.

In the following second step, the corresponding pixel row prx is identified for each captured pixel c, based on (i) the multiple first captured images Icr and (ii) the correspondence between the projection pixel rows pr and the first frequencies $f_1$ to $f_N$. Specifically, changes in patterns of a target captured pixel c in the M first captured images Icr are regarded as a movie and resolved by frequency based on Fourier transform. It is then determined which frequency component pattern among the first frequencies $f_1$ to $f_N$ is shown by the target captured pixel c. The projection pixel row pr that corresponds to the determined (identified) first frequency is identified as the corresponding pixel row prx.

Similarly, the corresponding pixel column(s) pcx is identified for each captured pixel c, based on (i) the multiple second captured images Icc and (ii) the correspondence between the projection pixel columns pc and the second frequencies $f_1$ to $f_N$. Specifically, changes in patterns of a target captured pixel c in the M second captured images Icc are regarded as a movie and resolved by frequency based on Fourier transform. It is then determined which frequency component pattern among the first frequencies $f_1$ to $f_N$ is shown by the target captured pixel c. The projection pixel column pc that corresponds to the determined second frequency is identified as the corresponding pixel column pcx.

The subsequent method for identifying the candidate projection pixel(s) px and for extracting the corresponding projection pixel pn based on the epipolar constraint is the same as in the above embodiments.

Advantageous Effects

As described above, according to one or more embodiments, the 3D shape measuring method includes: the first step to (i) project, with the projector 20 configured to project projection images Ip, the first projection images Ipr including row-direction stripe patterns different from each other and the second projection images Ipc including column-direction stripe patterns different from each other on the target object 2 and (ii) obtain, with the image capturing device 30 configured to obtain captured images Ic of the target object 2, first captured images Icr when the respective first projection images Ipr are projected and second captured images Icc when the respective second projection images Ipc are projected; the second step to identify a projection pixel p (corresponding projection pixel pn) of the projection images Ip, the corresponding projection pixel pn corresponding to each of captured pixels c of the captured images Ic; and the third step to identify the 3D shape of the target object 2 based on the result of the second step. The second step includes: identifying a corresponding pixel row prx that corresponds to each of the captured pixels c from among projection pixel rows pr constituting the projection images Ip, based on the first captured images Icr and the row-direction stripe patterns of the first projection images Ipr; identifying a corresponding pixel column pcx that corresponds to each of the captured pixels c from among projection pixel columns pc constituting the projection images Ip, based on the second captured images Icc and the column-direction stripe patterns of the second projection images Ipc; identifying a projection pixel p (a candidate projection pixel px) that is at an intersection of the corresponding pixel row prx and the corresponding pixel column pcx and that satisfies an epipolar constraint; and identifying the projection pixel p (corresponding projection pixel pn) that corresponds to each of the captured pixels c from among the candidate projection pixel px.

According to the above method, the dimension of the vector that describes a projection pattern can be reduced from $N^2$ in the conventional LTM method (the total number of pixels in the projection image Ip) to N (the number of rows/columns in a projection image Ip). That is, the dimension of the projection pattern matrix P (the matrix describing row-direction stripe patterns of multiple first projection images Ipr and the matrix describing column-direction stripe patterns of multiple second projection images Ipc) can be reduced. Accordingly, the computational complexity in matrix operations can be greatly reduced. The computing time can therefore be reduced.

Although the multiscale LT Matrix estimation method is known as a method to reduce computational complexity, the method may not allow parallel operation because the projection pattern matrix P changes after the resolution is switched. On the other hand, according to the method of the above embodiments, the same projection pattern matrix P can be used throughout the operation of identifying the matrices Wr and Wc (LTMs). Therefore, the above embodiments can easily parallelize operations. According to the known multiscale LT Matrix estimation method, the pattern matrix changes for each captured pixel c after the resolution is switched. The known method therefore may not parallelize operations for the respective captured pixels c and may not allow installation of the operations to a GPU. On the other hand, according to the method of the above embodiments, the projection pattern matrix P remains common for all the captured pixels c. Therefore, calculation of the matrix Wr and the matrix Wc for the respective captured pixels c can be standardized. This makes it easy to perform parallel operation for the respective captured pixels c. The computing time can therefore be reduced. Further, the method of the above embodiments can be installed in a GPU to further reduce the computing time.

Further, the processing for identifying corresponding pixel rows prx and the processing for identifying corresponding pixel columns pcx can also be parallelized. This can also reduce the computing time.

Further, according to the method of obtaining multiple combinations of a captured pixel c and corresponding projection pixels pn and extracting a combination(s) that satisfies the epipolar constraint, the corresponding projection pixel pn that corresponds to direct reflection light can be easily and appropriately extracted.

In one or more embodiments, the projection pixel p (candidate projection pixel px) that satisfies the epipolar constraint may be on an epipolar line Lp on the projection image Ip. According to such a configuration, the corresponding projection pixel pn that corresponds to direct reflection light can be correctly extracted. Thus, the measuring errors caused by indirect reflection light can be certainly reduced.

In one or more embodiments, the projection pixel p (candidate projection pixel px) that satisfies the epipolar constraint may be within a predetermined distance from the epipolar line Lp on the projection image Ip. According to such a configuration, the corresponding projection pixel pn that corresponds to direct reflection light can be certainly extracted. Thus, a failure to extract the corresponding projection pixel(s) pn corresponding to direct reflection light is less likely to occur.

In one or more embodiments, the second step may include: determining an evaluation value for each of the candidate projection pixel px such that a candidate projection pixel px closer to the epipolar line is given a greater weighting and identifying the projection pixel p (corresponding projection pixel pn) that corresponds to each of the captured pixels c, based on the evaluation value. According to such a configuration, a projection pixel p closer to the epipolar line Lp can be preferentially extracted as the corresponding projection pixel pn.

In one or more embodiments, a projection pixel p having the greatest evaluation value may be identified as the projection pixel p (corresponding projection pixel pn) that corresponds to each of the captured pixels c. According to such a configuration, the projection pixel p corresponding to direct reflection light can be more easily extracted, and the projection pixel p corresponding to indirect reflection light can be more easily excluded.

In one or more embodiments, a projection pixel p having an evaluation value equal to or greater than a predetermined reference value may be identified as the projection pixel p (corresponding projection pixel pn) that corresponds to each of the captured pixels c. According to such a configuration, the corresponding projection pixel pn that corresponds to direct reflection light can be certainly extracted. Thus, a failure to extract the corresponding projection pixel(s) pn corresponding to direct reflection light is less likely to occur.

In one or more embodiments, the positional relation between the projector 20 and the image capturing device 30 is determined such that the epipolar line Lp corresponding to any of the captured pixels c is not parallel with any of the projection pixel rows pr or the projection pixel columns pc constituting the projection images Ip. According to such a configuration, the epipolar constraint is more effective. In other words, by extracting the projection pixel p that satisfies the epipolar constraint, the projection pixel p that corresponds to direct reflection light can be correctly extracted.

In one or more embodiments, the second step may include: identifying a matrix Wr (LTM) that describes the corresponding pixel rows prx corresponding to the respective captured pixels c by applying sparse optimization, based on the captured image matrix C that describes the first captured images Icr and the projection pattern matrix P that describes the row-direction stripe patterns included in the first projection images Ipr; and identifying the matrix Wc (LTM) that describes corresponding pixel columns pcx corresponding to the respective captured pixels c by applying sparse optimization, based on the captured image matrix C that describes the second captured images Icc and the projection pattern matrix P that describes the column-direction stripe patterns included in the second projection images Ipc. According to such a configuration, the corresponding pixel row(s) prx and the corresponding pixel column(s) pcx can be correctly identified by simple calculations, based on the sparseness of the matrices Wr and Wc and based on a smaller number of first projection images Ipr and second projection images Ipc (i.e., a smaller number of first captured images Icr and second captured images Icc).

According to a modification of the 3D shape measuring method, wherein in the first step, in the first projection images Ipr, portions corresponding to the respective projection pixel rows pr in the row-direction stripe patterns change at first frequencies when the first projection images Ipr are projected, the first frequencies being different from each other for the respective projection pixel rows pr; and in the second projection images Ipc, portions corresponding to the respective projection pixel columns pc in the column-direction stripe patterns change at second frequencies when the second projection images Ipc are projected, the second frequencies being different from each other for the respective projection pixel columns pc. In the second step, the corresponding pixel row prx that corresponds to each of the captured pixels c is identified, based on the first captured images Icr and based on correspondences between the projection pixel rows pr and the first frequencies; and the corresponding pixel column pcx that corresponds to each of the captured pixels c is identified, based on the second captured images Icc and based on correspondences between the projection pixel columns pc and the second frequencies. Such a method can also identify the corresponding pixel row prx and the corresponding pixel column pcx.

In one or more embodiments, in each of the projection images Ip, the number of pixel rows pr is equal to the number of pixel columns pc. According to such a configuration, the processing for identifying corresponding pixel rows prx and the processing for identifying corresponding pixel columns pcx can be standardized. This reduces the processing load of the CPU 11 and easily allows parallel processing.

In one or more embodiments, the column-direction stripe patterns in the second projection images Ipc are identical to the row-direction stripe patterns in the first projection images Ipr except the direction of the patterns. According to such a configuration, the same projection pattern matrix P (matrix A) can be used in the operation for identifying the corresponding pixel rows prx and the operation for identifying the corresponding pixel columns pcx. This makes it easier to perform parallel processing.

According to one or more embodiments, the 3D shape measuring apparatus 10 includes the CPU 11 as a hardware processor. The CPU 11 performs: the first process of (i) projecting, with the projector 20 configured to project projection images Ip, the first projection images Ipr including row-direction stripe patterns different from each other and the second projection images Ipc including column-direction stripe patterns different from each other on the target object 2 and (ii) obtaining, with the image capturing device 30 configured to obtain captured images of the target object 2, first captured images Icr when the respective first projection images Ipr are projected and second captured images Icc when the respective second projection images Ipc are projected; the second process of identifying a projection pixel p (corresponding projection pixel pn) of the projection images Ip, the corresponding projection pixel pn corresponding to each of captured pixels c of the captured images Ic; and the third process of identifying a 3D shape of the target object 2 based on a result of the second process. The second process includes: identifying a corresponding pixel row prx that corresponds to each of the captured pixels c from among projection pixel rows pr constituting the projection images Ip, based on the first captured images Icr and the row-direction stripe patterns of the first projection images Ipr; identifying a corresponding pixel column pcx that corresponds to each of the captured pixels c from among projection pixel columns pc constituting the projection images Ip, based on the second captured images Icc and the column-direction stripe patterns of the second projection images Ipc; identifying a projection pixel p (a candidate projection pixel px) that is at an intersection of the corresponding pixel row prx and the corresponding pixel column pcx and that satisfies an epipolar constraint; and identifying the projection pixel p (corresponding projection pixel pn) that corresponds to each of the captured pixels c from among the candidate projection pixel px.

According to such a configuration, the row-direction stripe patterns and column-direction stripe patterns are used to reduce the dimension of the projection pattern matrix P. This greatly reduces the computational complexity in matrix operations and computing time. The configuration also allows standardizing of calculation for the respective captured pixels c and makes it easy to parallelize operations for the respective captured pixels c. Thus, the computing time can be reduced. Further, the above configuration can be installed in a GPU to further reduce the computing time. Further, the processing for identifying corresponding pixel rows prx and the processing for identifying corresponding pixel columns pcx can be parallelized. This further reduces the computing time. Further, according to the method of obtaining multiple combinations of a captured pixel c and corresponding projection pixels pn and extracting a combination(s) that satisfies the epipolar constraint, the corresponding projection pixel pn that corresponds to direct reflection light can be easily and appropriately extracted.

The above embodiments and modification do not limit the present invention and can be variously modified.

Although the above embodiments include the 3D shape measuring apparatus 10, the projector 20, and the image capturing device 30 as individual components, the present invention is not limited to such a configuration. Part of or all of these components can be integrated.

Further, although the row-direction stripe patterns of the first projection images Ipr and the column-direction stripe patterns of the second projection images Ipc consist of combinations of two values (on (black) and off (white)), the present invention is not limited to such a configuration. The row-direction stripe patterns and the column-direction stripe patterns may consist of combinations of three or more values. In other words, the pixel value of each projection pixel p constituting the first projection images Ipr and the second projection images Ipc is not limited to binary but may be multi-valued (may have three or more values).

The projection pixels p of the projection image Ip correspond to the pixels of the projector element of the projector 20 one-by-one. Also, the captured pixels c of the captured image Icc correspond to the pixels of the image sensor of the image capturing device 30. Therefore, identifying the corresponding projection pixel pn that corresponds to a captured pixel c can be rephrased as identifying the pixel of the projector element corresponding to the pixel of the image sensor.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A three-dimensional (3D) shape measuring method comprising:
    a first step to:
        project, with a projector, first and second projection images on a target object, wherein the first projection images include row-direction stripe patterns different from each other, and the second projection images include column-direction stripe patterns different from each other, and
        obtain, with an image capturing device, first and second captured images of the target object, wherein the first captured images are captured while the first projection images are projected, and the second captured images are captured while the second projection images are projected;
    a second step to identify a corresponding projection pixel of the first and second projection images, wherein the corresponding projection pixel corresponds to each of captured pixels of the first and second captured images; and
    a third step to identify a 3D shape of the target object based on a result of the second step, wherein
    the second step comprises:
        identifying a corresponding pixel row that corresponds to each of the captured pixels from among projection pixel rows constituting the first projection images, based on the first captured images and the row-direction stripe patterns;
        identifying a corresponding pixel column that corresponds to each of the captured pixels from among projection pixel columns constituting the second projection images, based on the second captured images and the column-direction stripe patterns;
        identifying a candidate projection pixel that is at an intersection of the corresponding pixel row and the corresponding pixel column and that satisfies an epipolar constraint; and
        identifying the corresponding projection pixel from the candidate projection pixel, in each of the first and second projection images, a number of pixel rows is equal to a number of pixel columns, and
    the column-direction stripe patterns are identical to the row-direction stripe patterns except a direction of the patterns.

2. The 3D shape measuring method according to claim 1, wherein
    the candidate projection pixel is on an epipolar line on, among the first and second projection images, a projection image to which the candidate projection pixel belongs.

3. The 3D shape measuring method according to claim 2, wherein
    a positional relation between the projector and the image capturing device is determined such that the epipolar line corresponding to any of the captured pixels is not parallel with any of the projection pixel rows or any of the projection pixel columns.

4. The 3D shape measuring method according to claim 1, wherein
    the candidate projection pixel is within a predetermined distance from an epipolar line on, among the first and second projection images, a projection image to which the candidate projection pixel belongs.

5. The 3D shape measuring method according to claim 4, wherein
    the second step comprises:
        determining an evaluation value for the candidate projection pixel such that the candidate projection pixel is given a greater weighting as closer to the epipolar line, and
        identifying the corresponding projection pixel based on the evaluation value.

6. The 3D shape measuring method according to claim 5, wherein
    a projection pixel having a greatest evaluation value is identified as the corresponding projection pixel.

7. The 3D shape measuring method according to claim 5, wherein
    a projection pixel having an evaluation value equal to or greater than a predetermined reference value is identified as the corresponding projection pixel.

8. The 3D shape measuring method according to claim 1, wherein
    in the first step,
        first portions of the first projection images change at first frequencies while the first projection images are projected, wherein the first portions correspond to the respective projection pixel rows in the row-direction stripe patterns, and the first frequencies are different from each other for the respective projection pixel rows, and
        second portions of the second projection images change at second frequencies while the second projection images are projected, wherein the second portions correspond to the respective projection pixel columns in the column-direction stripe patterns, and the second frequencies are different from each other for the respective projection pixel columns, and in the second step,
the corresponding pixel row is identified based on the first captured images and based on correspondences between the projection pixel rows and the first frequencies, and
the corresponding pixel column is identified based on the second captured images and based on correspondences between the projection pixel columns and the second frequencies.

9. A three-dimensional (3D) shape measuring method comprising:
a first step to:
project, with a projector, first and second projection images on a target object, wherein the first projection images include row-direction stripe patterns different from each other, and the second projection images include column-direction stripe patterns different from each other, and
obtain, with an image capturing device, first and second captured images of the target object, wherein the first captured images are captured while the first projection images are projected, and the second captured images are captured while the second projection images are projected;
a second step to identify a corresponding projection pixel of the first and second projection images, wherein the corresponding projection pixel corresponds to each of captured pixels of the first and second captured images; and
a third step to identify a 3D shape of the target object based on a result of the second step, wherein
the second step comprises:
identifying a corresponding pixel row that corresponds to each of the captured pixels from among projection pixel rows constituting the first projection images, based on the first captured images and the row-direction stripe patterns;
identifying a corresponding pixel column that corresponds to each of the captured pixels from among projection pixel columns constituting the second projection images, based on the second captured images and the column-direction stripe patterns;
identifying a candidate projection pixel that is at an intersection of the corresponding pixel row and the corresponding pixel column and that satisfies an epipolar constraint; and
identifying the corresponding projection pixel from the candidate projection pixel, and the second step further comprises:
identifying a light transport matrix (LTM) that describes corresponding pixel rows each of which is the corresponding pixel row by applying sparse optimization, based on the first captured images and the row-direction stripe patterns; and
identifying an LTM that describes corresponding pixel columns each of which is the corresponding pixel column by applying sparse optimization, based on the second captured images and the column-direction stripe patterns.

10. A three-dimensional (3D) shape measuring apparatus comprising:
a hardware processor that executes:
a first process of:
projecting, with a projector, first and second projection images on a target object, wherein the first projection images include row-direction stripe patterns different from each other, and the second projection images include column-direction stripe patterns different from each other, and
obtaining, with an image capturing device, first and second captured images of the target object, wherein the first captured images are captured while the first projection images are projected, and the second captured images are captured while the second projection images are projected;
a second process of identifying a corresponding projection pixel of the first and second projection images, wherein the corresponding projection pixel corresponds to each of captured pixels of the first and second captured images; and
a third process of identifying a 3D shape of the target object based on a result of the second process, wherein
the second process comprises:
identifying a corresponding pixel row that corresponds to each of the captured pixels from among projection pixel rows constituting the first projection images, based on the first captured images and the row-direction stripe patterns;
identifying a corresponding pixel column that corresponds to each of the captured pixels from among projection pixel columns constituting the second projection images, based on the second captured images and the column-direction stripe patterns;
identifying a candidate projection pixel that is at an intersection of the corresponding pixel row and the corresponding pixel column and that satisfies an epipolar constraint; and
identifying the corresponding projection pixel from the candidate projection pixel,
in each of the first and second projection images, a number of pixel rows is equal to a number of pixel columns, and
the column-direction stripe patterns are identical to the row-direction stripe patterns except a direction of the patterns.

* * * * *